United States Patent [19]
Erickson et al.

[11] Patent Number: 5,513,558
[45] Date of Patent: May 7, 1996

[54] RAPID COOKING DEVICE

[75] Inventors: Chad Erickson, Plymouth; David Dornbush, Prior Lake; John Finn, Minneapolis, all of Minn.

[73] Assignee: American Harvest, Inc., Chaska, Minn.

[21] Appl. No.: 57,446

[22] Filed: May 5, 1993

Related U.S. Application Data

[63] Continuation of Ser. No. 902,531, Jun. 22, 1992, abandoned, which is a continuation of Ser. No. 325,157, Mar. 17, 1989, abandoned, which is a continuation-in-part of Ser. No. 14,997, Feb. 17, 1987, Pat. No. 4,817,509.

[51] Int. Cl.$^6$ .............................. A47J 27/00; A47J 37/00
[52] U.S. Cl. .................. 99/330; 99/331; 99/341; 99/447; 99/450; 99/476; 126/21 A; 219/386; 219/400
[58] Field of Search .................. 99/330, 332, 331, 99/341, 385, 325, 401, 447, 450, 476; 219/400, 402, 408, 409, 413, 414, 370, 386, 385; 126/21 A, 273 R, 275 R, 275 E; 432/199; 34/133 R

[56] References Cited

U.S. PATENT DOCUMENTS

| | | |
|---|---|---|
| D. 293,539 | 1/1988 | Nishikawa . |
| 1,986,088 | 11/1933 | Wild . |
| 2,408,331 | 4/1943 | Mills . |
| 2,523,796 | 9/1950 | Weeks . |
| 2,708,708 | 5/1955 | Ronsch . |
| 2,898,437 | 6/1956 | McFarland . |
| 2,949,524 | 9/1957 | Scarioni . |
| 2,957,067 | 10/1960 | Scofield et al. . |
| 3,007,530 | 2/1963 | Chase et al. . |
| 3,074,179 | 1/1963 | Stelling . |
| 3,168,642 | 2/1965 | Savio . |
| 3,239,651 | 3/1966 | Silberman . |
| 3,266,559 | 8/1966 | Osborne et al. . |

(List continued on next page.)

FOREIGN PATENT DOCUMENTS

| | | |
|---|---|---|
| 934357 | 5/1948 | France . |
| 1005315 | 4/1952 | France . |
| 2390928 | 12/1978 | France . |
| 2409736 | 6/1979 | France . |
| 2410989 | 7/1979 | France . |
| 2412835 | 9/1975 | Germany ............................ 219/400 |
| 7442343 | 7/1976 | Germany . |
| 2555522 | 6/1977 | Germany . |
| 2632000 | 3/1978 | Germany . |
| 2753827 | 7/1979 | Germany . |
| 8521204 | 10/1985 | Germany . |
| 57-41529 | 3/1982 | Japan . |
| 57-174624 | 10/1982 | Japan .................................. 219/400 |
| 89-6259 | 5/1989 | Rep. of Korea . |
| 643129 | 5/1984 | Switzerland . |
| 489471 | 8/1938 | United Kingdom . |
| 1429482 | 3/1976 | United Kingdom . |
| 2007515 | 5/1979 | United Kingdom . |
| 2072329 | 9/1981 | United Kingdom . |
| 2102561 | 2/1983 | United Kingdom . |
| 8700261 | 1/1987 | WIPO .................................. 219/400 |

OTHER PUBLICATIONS

Cyclone Turbo Multi Cooker (date unknown).
Aroma Super Turbo Oven brochure Dec. 29, 1988.
Stovetop brochure (date unknown).
Farberware brochure Feb. 6, 1984.
Rair brochure, 1983 (month unknown).
Sailor Newspaper article dated Oct. 3, 1983.
Search Marketing, Inc. brochure, 1982 (month unknown).

*Primary Examiner*—Timothy F. Simone
*Attorney, Agent, or Firm*—Merchant, Gould, Smith, Edell, Welter & Schmidt

[57] ABSTRACT

A rapid cooking method is provided in which food pieces are contacted with an air stream at a velocity of at least 1,000 linear feet per minute.

Rapid cooking equipment is disclosed which creates high velocity air current.

63 Claims, 12 Drawing Sheets

U.S. PATENT DOCUMENTS

| | | |
|---|---|---|
| 3,414,708 | 12/1968 | Maier . |
| 3,514,576 | 5/1970 | Hilton et al. . |
| 3,529,556 | 9/1970 | Barnes . |
| 3,529,582 | 9/1970 | Hurko et al. . |
| 3,586,516 | 6/1971 | Terc ........................................ 219/400 |
| 3,692,968 | 9/1972 | Yasouka . |
| 3,770,408 | 11/1973 | McCully ................................. 219/400 |
| 3,817,346 | 6/1974 | Wehmeyer . |
| 3,820,524 | 6/1974 | Bushell . |
| 3,821,454 | 6/1974 | Lobel . |
| 3,828,760 | 8/1974 | Farber et al. . |
| 3,883,671 | 5/1975 | Shatila . |
| 3,884,213 | 5/1975 | Smith . |
| 3,926,106 | 12/1975 | Deusing et al. . |
| 3,962,962 | 6/1976 | Anderson . |
| 3,978,843 | 9/1976 | Durth . |
| 4,010,341 | 3/1977 | Ishammer . |
| 4,010,349 | 3/1977 | Lee . |
| 4,039,776 | 8/1977 | Roderick . |
| 4,051,347 | 9/1977 | Rohrl et al. . |
| 4,071,738 | 1/1978 | Jenn et al. . |
| 4,071,739 | 1/1978 | Jenn et al. . |
| 4,092,390 | 5/1978 | Mulvany ................................. 219/400 |
| 4,112,916 | 9/1978 | Guibert . |
| 4,113,336 | 1/1979 | Smith . |
| 4,132,216 | 1/1979 | Guibert . |
| 4,154,861 | 5/1979 | Smith . |
| 4,173,215 | 11/1979 | Bureau et al. . |
| 4,203,572 | 1/1980 | Melgaard . |
| 4,210,072 | 7/1980 | Pedrini . |
| 4,226,178 | 10/1980 | Geissler et al. . |
| 4,286,456 | 9/1981 | Sisti et al. . |
| 4,295,034 | 10/1981 | Assmann . |
| 4,327,279 | 4/1982 | Guibert ................................... 219/400 |
| 4,350,874 | 9/1982 | Nishikawa . |
| 4,374,318 | 2/1983 | Gilliom . |
| 4,374,319 | 2/1983 | Guibert . |
| 4,375,184 | 3/1983 | Gilliom . |
| 4,420,679 | 12/1983 | Howe ...................................... 219/413 |
| 4,426,923 | 1/1984 | Ohata . |
| 4,439,459 | 3/1984 | Swartley . |
| 4,455,924 | 6/1984 | Wenzel . |
| 4,460,822 | 7/1984 | Alden et al. . |
| 4,467,777 | 8/1984 | Weber . |
| 4,471,000 | 9/1984 | Brown et al. . |
| 4,477,706 | 10/1984 | Mittelsteadt ........................ 219/400 X |
| 4,481,396 | 11/1984 | Matsubayashi et al. ............ 219/400 X |
| 4,484,063 | 11/1984 | Whittenbury et al. . |
| 4,484,064 | 11/1984 | Murray ................................... 219/400 |
| 4,491,065 | 1/1985 | Poulson . |
| 4,503,760 | 3/1985 | Pryputsch et al. . |
| 4,506,598 | 3/1985 | Meister . |
| 4,509,412 | 4/1985 | Whittenburg . |
| 4,516,012 | 5/1985 | Smith . |
| 4,561,348 | 12/1985 | Halters et al. . |
| 4,591,698 | 5/1986 | Chang . |
| 4,749,581 | 6/1988 | Gorsuch et al. . |
| 4,757,800 | 7/1988 | Shei et al. . |
| 4,781,169 | 11/1988 | Henke et al. . |
| 4,817,509 | 4/1989 | Erickson ................................... 99/330 |
| 4,818,550 | 4/1989 | Davidson . |
| 5,165,328 | 11/1992 | Erickson et al. ......................... 99/330 |

RAPID COOKING DEVICE

This is a continuation of application of Ser. No. 902,531 filed Jun. 22, 1992 and now abandoned, which in turn is a continuation of application of Ser. No. 325,157 filed Mar. 17, 1989 and now abandoned, which in turn is a continuation-in-part of U.S. patent application Ser. No. 014,997, filed Feb. 17, 1987, now issued as U.S. Pat. No. 4,817,509.

FIELD OF THE INVENTION

The present invention relates to methods for cooking of food products and more particularly to methods for cooking using a high velocity air current to rapidly cook the food product.

BACKGROUND OF THE INVENTION

A wide variety of cooking methods and cooking devices have been provided in the past. Deep fat frying and broiling are illustrative of methods of cooking that have been around for years. The conventional oven is also illustrative of cooking devices that have been in use for many years. In fact, simple ovens in various forms have been in use for centuries in homes, commercial bakeries, institutional kitchens and restaurants.

Conventional ovens have been provided in a variety of models and sizes, for example, a permanent, built-in style, mounted in cabinetry, together with or independent of a stove top unit. Conventional ovens have also been provided of a portable design. While the conventional oven remains a basic essential cooking unit in the home as well as restaurants or the like, conventional ovens do have their shortcomings. Conventional ovens, for example, tend to cook slowly and thus consume a good deal of the user's time.

Attempts have been made to overcome this problem; for example, microwave ovens have become popular. While microwave ovens cook rapidly, they too have their shortcomings. For example, it is difficult to brown food in a microwave oven.

Other attempts at solving the slowness of conventional ovens have been to include a circulating fan to move the air in the oven. While such circulating fans have provided more rapid cooking, the time required is still very substantial. Such existing ovens perform their tasks in a similar way. The majority of such cooking devices consist of a rectangular oven, usually equipped with a plurality of racks, much like that found in conventional in-home ovens. Often at the rear of the oven is a squirrel-cage type blower which draws the air through a hole in the interior rear wall and blows the air out to the sides where it is directed to perforations in the two interior side walls. This pressurized air is then forced through the perforations toward the rear center of the oven enclosure, where it is drawn into the blower intake hole and recirculated, thereby completing a closed loop. An oven produced by Rair follows the above pattern with the exception of circulating the air through a cylindrical chamber with its axis positioned horizontally.

Air velocities within the cooking chamber of such ovens are low in comparison to the present method and vary widely within each oven. The velocities are generally the highest immediately in front of the blower intake. A typical average air speed found in a commercial restaurant convection oven is approximately 350 feet per minute.

A conventional square or rectangular chamber, especially with sharp corners, offers great resistance to the smooth flow of air due to the abrupt change in direction of the air stream at each corner encountered. This makes it difficult for conventional ovens to achieve the air velocities of the present invention. Turbulence is created in conventional chambers as well as stagnant areas of relatively cool air in the corners and thus the air velocities are difficult to obtain without displacement of the food pieces. Earlier forced air designs make use of large blowers and powerful motors to pressurize the air and force it as evenly as possible through the cooking chamber, usually through perforations or louvers in the interior walls of the cooking chamber. Such prior devices have not been effective to produce the results found in the present invention since they do not achieve the necessary velocities. Also such high power devices are not practical when designing a lightweight portable appliance, due to the excessive noise, added cost and space requirements of such a design.

Prior ovens with fans have not been able to get their fans to achieve high rates of speed for the two following reasons. Ovens with fans often disrupt or restrict their air flow in one or both of two ways:

The prior ovens disrupt or restrict the fans air output by forcing the air through a grease filter. The function of that filter is typically to protect the fan from grease. The present fan is self-cleaning and does not have the problem of having to restrict air velocities by forcing the air through a grease filter.

Prior ovens also disrupt or restrict the air flow by placing the heating elements so that the air coming off the fan blades passes over and around the heating element. This is done to heat the air, but it also severely disrupts the air flow making it more difficult to achieve higher, free-flow air velocities. The present invention disposes the heating element behind the fan in a position where it does not disrupt or restrict the air flow, thus achieving higher rates of air flow with better results.

Prior ovens with fans do not extend the fans down into the cooking chamber. The fans are generally recessed into the wall of the cooking chamber or into the roof of that cooking chamber. The fans are therefore covered by or partially blocked by either the wall, a filter, of some other enclosure or housing.

The fan blade in the present invention projects into the cooking chamber where it drives the air free and essentially unrestricted by any enclosure. It is the position of the present fan within or relative to the chamber that contributes to its ability to achieve the high air velocities and the attendant results.

Various means of heating the air are used, usually employing natural gas heat exchangers located in the sides of the oven or electrical tubular heating elements located in the lower portion of the oven.

A rapid cooking device has been the deep fat fryer. Such fryers are typically used to prepare French fries, breaded shrimp, fried chicken and the like. Deep fat fryers will typically cook food pieces in from one to five minutes. Deep fat fryers brown the product and develop desirable flavor characteristics. Deep fat fryers, however, also have inherent disadvantages. One such inherent disadvantage is the fact that the cooked food product has very high levels of fats, thus increasing the caloric content as well as the potential adverse effects of cholesterol on the consumer's circulatory system.

SUMMARY OF THE INVENTION

The present cooking method provides very rapid and very high rate of heat exchange cooking using high velocity air streams. The present invention achieves results very similar to baking, frying, broiling, rotisserie cooking, toasting, boiling, microwave, range cooking, however, with improved results. One may simultaneously bake a cinnamon roll, fry bacon and boil an egg. Any of a wide variety of foods may be cooked using the present method, for example, meats, eggs, various forms of potatoes (e.g., baked, american fries), breads (e.g., dough pieces for bread loaves, sweet rolls and the like). The air stream may be provided in any type of apparatus capable of producing the velocities while avoiding displacement of the food pieces. The necessary conditions of temperature and air velocities may be provided in a cylindrical cooking chamber of the type shown in U.S. Pat. No. 4,817,509. Such cooking device desirably has a patterned air current, e.g. cyclone shape, although a somewhat turbulent air flow is acceptable so long as the air velocities can be maintained at the necessary level. The air frier shown in U.S. Pat. No. 4,817,509 has a cylindrical cooking chamber with gentle radii in the upper and lower corners to facilitate smooth air flow around these corners. The round shape of the chamber unlike conventional air stream ovens, works in cooperation with an elevated air stream velocity, rather than against the air flow.

The present invention provides a solution to the various problems confronted by previous methods of cooking including methods using convection ovens as well as the deep fat fryers. The present invention provides very rapid cooking, develops browning and flavoring of the cooked product, and will provide products similar to those typically deep fat fried but with controlled oil content.

The present invention in its preferred form may be carried out using an air frier with a lower or bottom unit which has a circular circumferential wall and a lower integral wall. The lower unit has a rack on which the food pieces may be placed for cooking purposes. A hold down rack may overlie the food pieces during cooking thereby permitting higher air velocities. The unit may include a top portion which likewise has a circumferential wall and an integral top wall. An opening may be defined in the central portion of the top wall into which a powered heater may be removably mounted. A small vent may draw moisture laden air from said top portion to increase the cooking rate.

The powered heating unit heats an air stream and moves the air stream within the chamber defined by the lower unit and the upper unit at very high velocities, for example, in excess of 1,000 linear feet per minute, e.g. typically 1200 to 2500 linear feet per minute. The apparatus may include mechanism to adjust the air velocity and temperature to achieve optimum cooking conditions. The air stream flowing past the heater coil maintains the heater coil at a temperature such that the coil remains black. Desirably, the air flow in the cooking chamber is in a cyclone configuration. The direction of air flow may be periodically reversed to facilitate uniform cooking.

The two portions of the unit may form a clam-shell structure and may be hingedly connected so that the top may be pivoted upwardly to provide access to the rack. The hinged connection may provide a positive electrical disconnect to prevent operation of the blower or heating element when the top is pivoted upwardly.

The cooking device enclosure may be molded in high temperature plastic as two pieces, a top and a bottom. Construction of the device of plastic permits temperatures in the chamber 400° F. and higher while avoiding danger of burning the user should the user touch the plastic, e.g. the temperature drop across the plastic wall is substantial where as this would not be the case with glass or metal. A single round wire or plastic rack may be supported in the bottom half. The height of the rack may be adjusted up or down to meet the needs of different sized food pieces. In order to accommodate taller items such as loaves of bread or turkeys, the user may add one or more extension rings between the upper and lower halves of the cooking enclosure. Extension segments may also be added to the hinge support assembly to match the extended height of the cooking enclosure.

By removing the rack and detaching the blower and hinge assembly, the cooking enclosure may be used as an oven-proof casserole dish or an attractive serving dish. With molded-in feet, the enclosure may be placed on the dining table without the need of a trivet.

The use of a plastic or polymeric cooking enclosure provides a low thermal mass for rapid heat up and cool down, low thermal conductivity to slow heat loss and reduced risk of burns to the user, and lightweight for low cost shipping, easy portability and convenient use.

The device may have a transparent plastic top for clear observation of food while cooking, a low risk of breakage or cuts from broken pieces, and resistance to dents, chips, scratches or sharp edges found on painted metal parts.

IN THE DRAWINGS

DETAILED DESCRIPTION OF THE METHOD OF THE INVENTION

Figure 1:
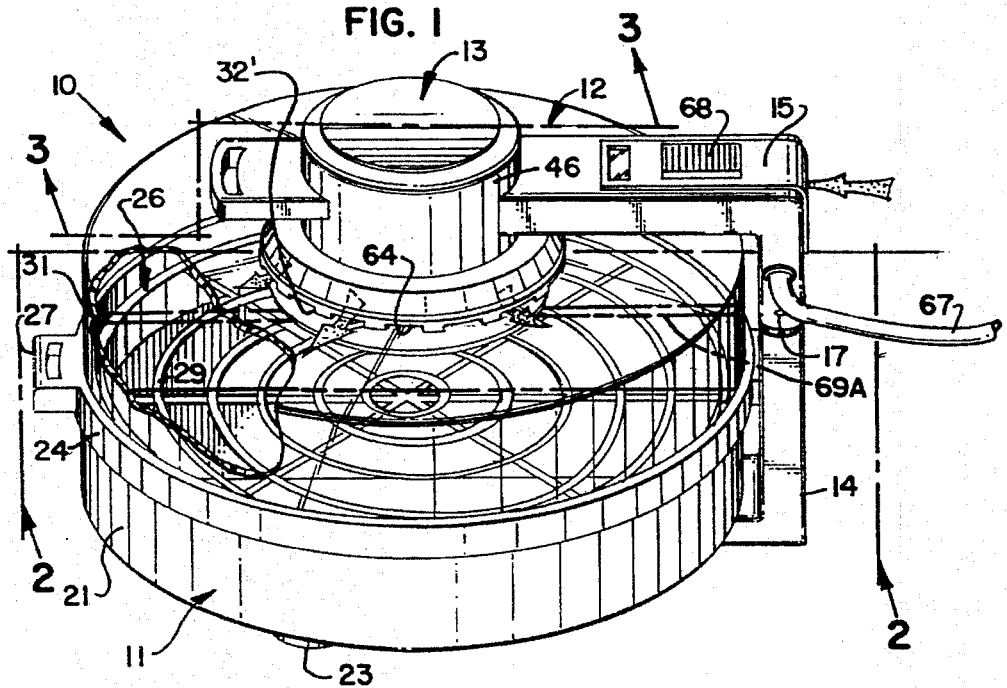
FIG. 1 is a perspective view of the cooking device for use in the method of the present invention.

The method of the present invention includes placing the food product in a location in a self-contained countertop oven where the air current can substantially surround the cooking surfaces of the food piece. An air current is then applied to the food piece at a velocity of at least 1000 linear feet per minute desirably between 1200 and 2500 linear feet per minute. The velocity of the air stream may be as high as 4000 feet per minute or higher with certain food pieces so long as the food piece is not displaced. The temperature of the air is at least 125° F. desirably between 180° and 450° F.

The air current desirably is in the form of a cyclone shape which repeatedly recirculates within the cooking chamber in order to achieve a velocity of at least 1000 linear feet per minute. The cyclone helix may have both a straight vertical axis and a circular horizontal axis. The air stream generally transverses the food piece in a path parallel to the upper and lower surfaces of the food piece thus providing intimate contact between the hot air stream and the food piece. This minimizes any air layer barrier adjacent to the surface of the food piece. The direction of the air current may be periodically reversed during the cooking cycle. The cyclone air flow may be used to rotate the tray thus providing an interesting display of the food and improved visibility. A low friction interface may be provided between the tray and the base of the cooker.

One cooking device 10 for carrying out the method of the present invention, as illustrated in FIGS. 1 through 6, includes a base member 11, a top 12 and a powered heater unit 13. The heater unit 13 is in locked engagement with top 12 as hereinafter described. The cooking device 10 further includes a lower frame bracket 14 and an upper frame bracket 15. Brackets 14 and 15 may be hingedly interconnected such as by removable pin 17. The brackets 14 and 15 may be integrally secured to the base 11 and top 12 respectively, or alternatively, they may be removably secured such as by snap mechanism 18.

The base 11 may be suitably formed of a polymeric material and includes a circumferential wall 21, an integral lower wall 22 and a plurality of feet 23. The feet 23 serve to elevate the lower wall 22 upwardly from a support surface such as a countertop. The lower unit 11 may include a thickened upper rim 24 defining a slot 26 into which the top 12 may be lodged. The base 11 may include a handle 27. The circumferential wall 21 has a plurality of small projections 28 which serve to support the rack 29 on which the food pieces may be disposed. The rack 29 may be of a conventional wire construction as illustrated in FIGS. 1 and 2.

The top 12 of the cooking unit 10 likewise includes a circumferential wall 31 and an upper wall 32. The wall 32 may be integral with wall 31. Top 12 may be produced by injection molding, or alternatively, vacuum molding. The upper wall 32 has an opening 32' defined therein for receipt of the powered heating unit 13. The opening 32' may be defined by rim 33 including a thickened vertical wall 35 and an inwardly-extending wall 36.

Figure 2:
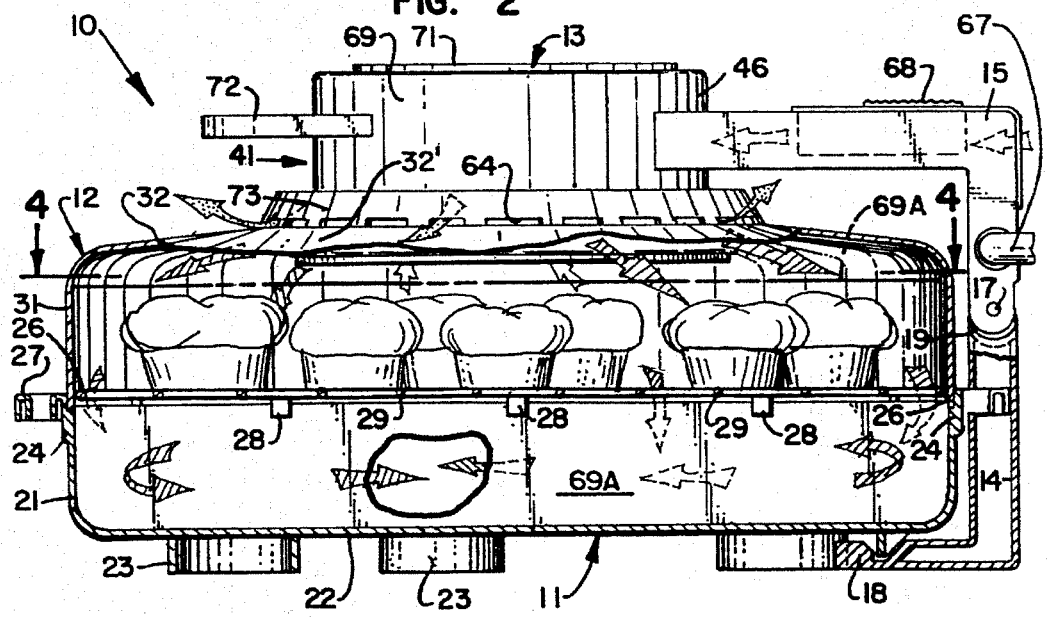
FIG. 2 is a sectional view taken along the lines 2—2 in FIG. 1.
Figure 3:
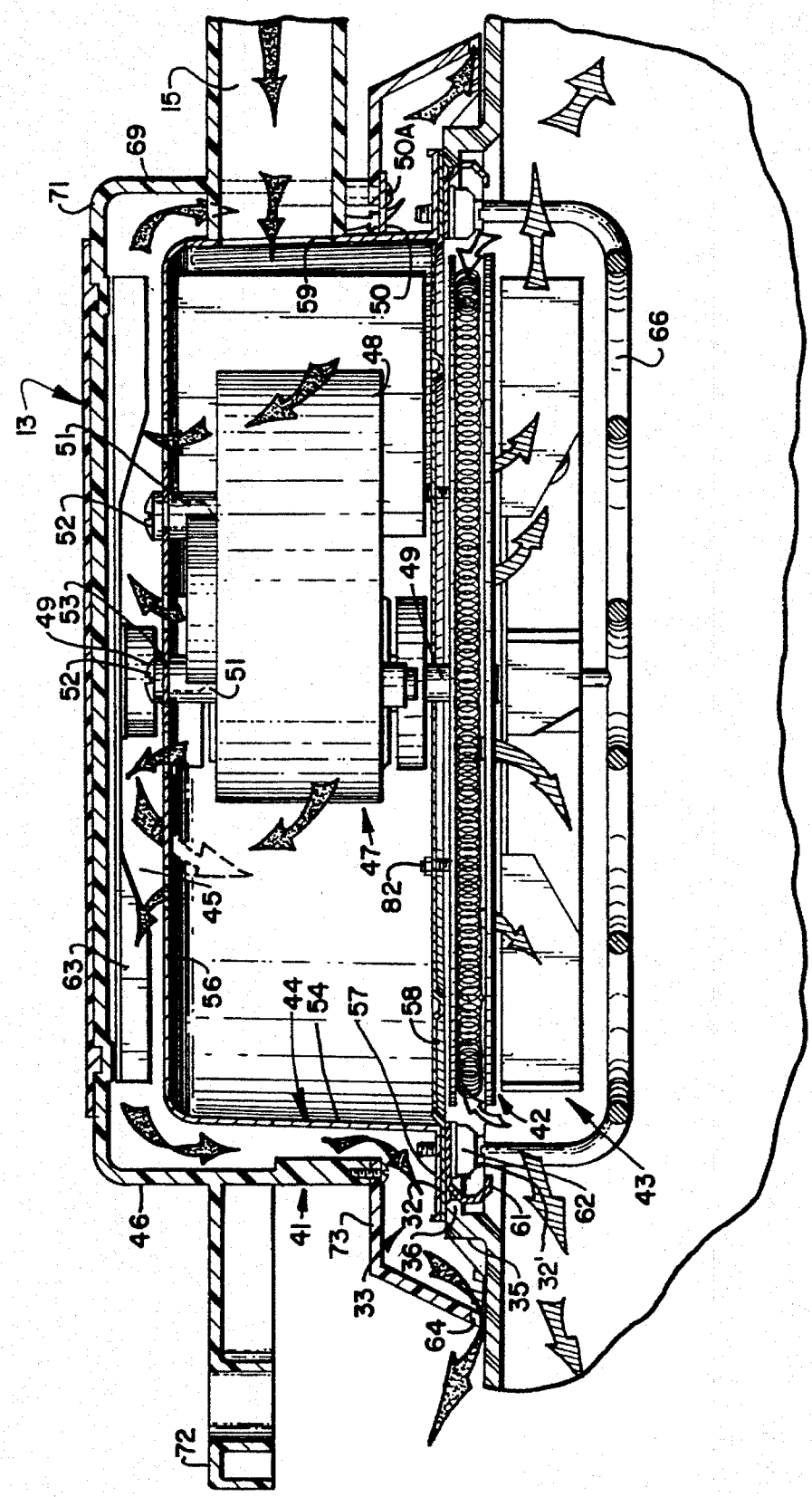
FIG. 3 is a sectional view of the upper portion of the apparatus for use in the present invention showing the electric motor, resistance heating element and the blower blade taken along the lines 3—3 in FIG. 1.
Figure 4:
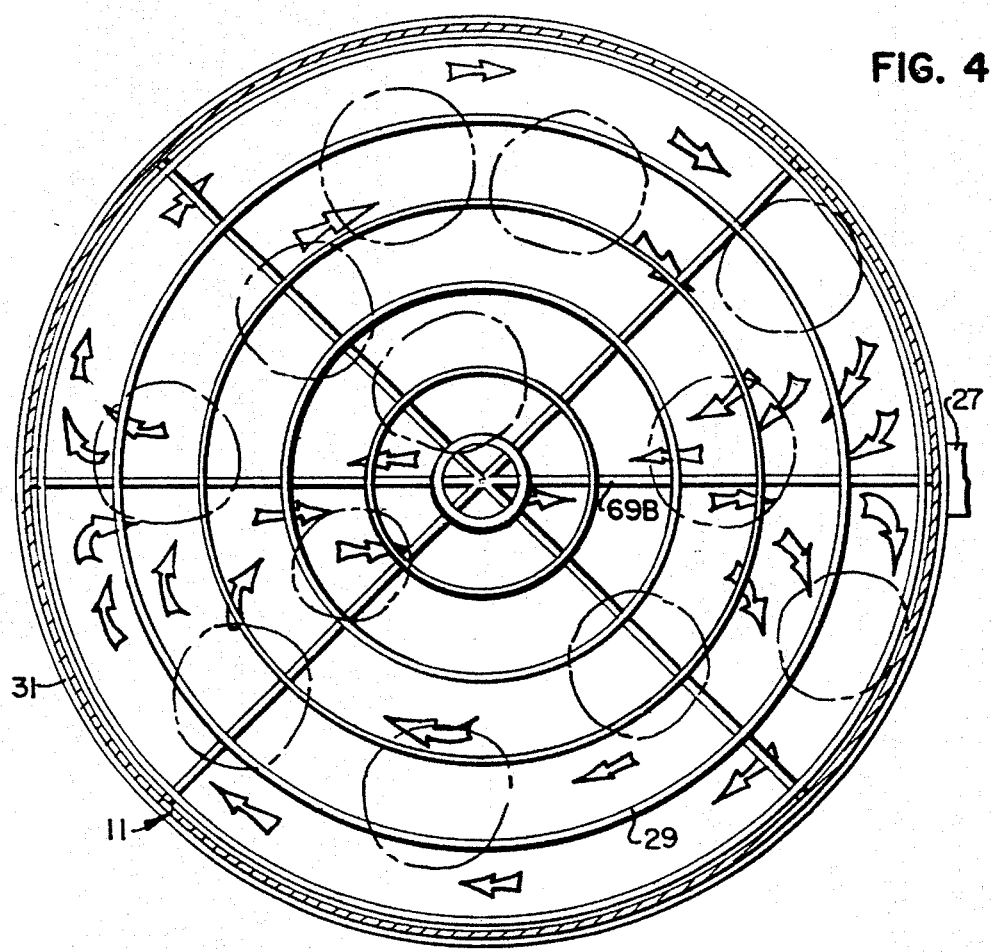
FIG. 4 is a view taken along the lines 4—4 in FIG. 2.
Figure 6:
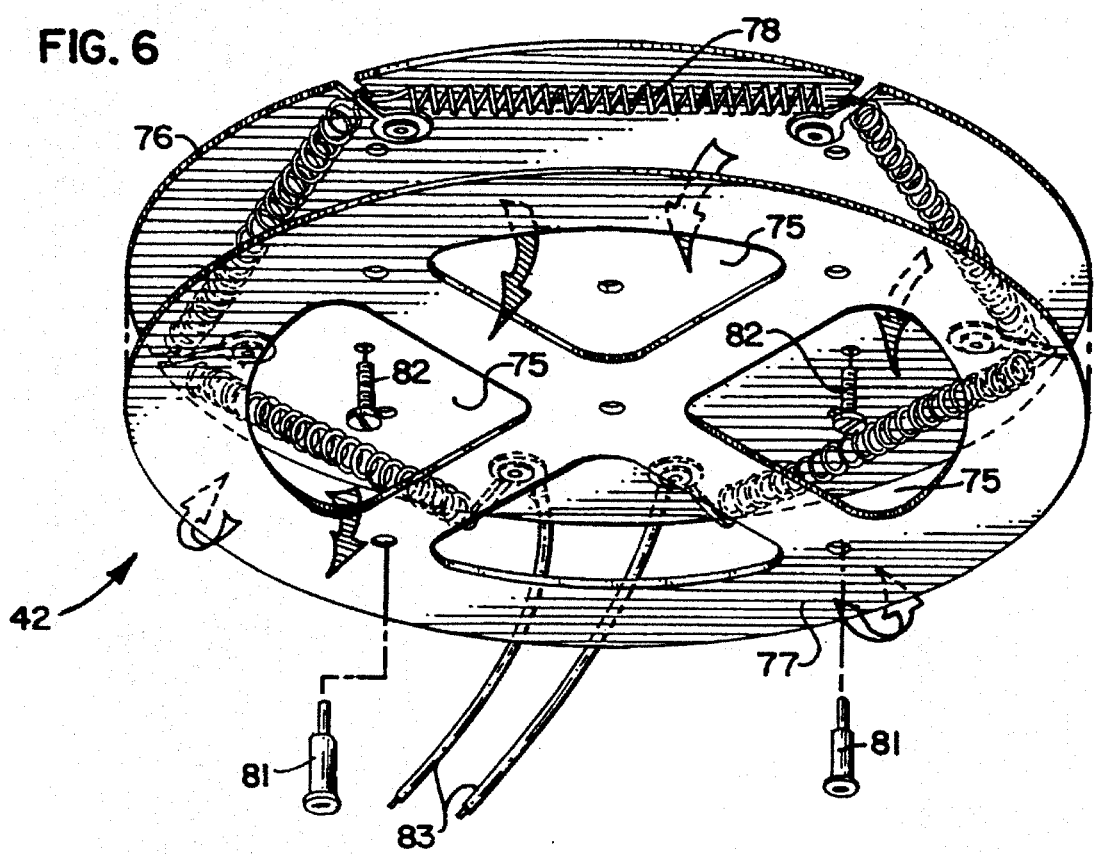
FIG. 6 is an exploded view of the heater unit as seen from beneath the unit.
Figure 7:
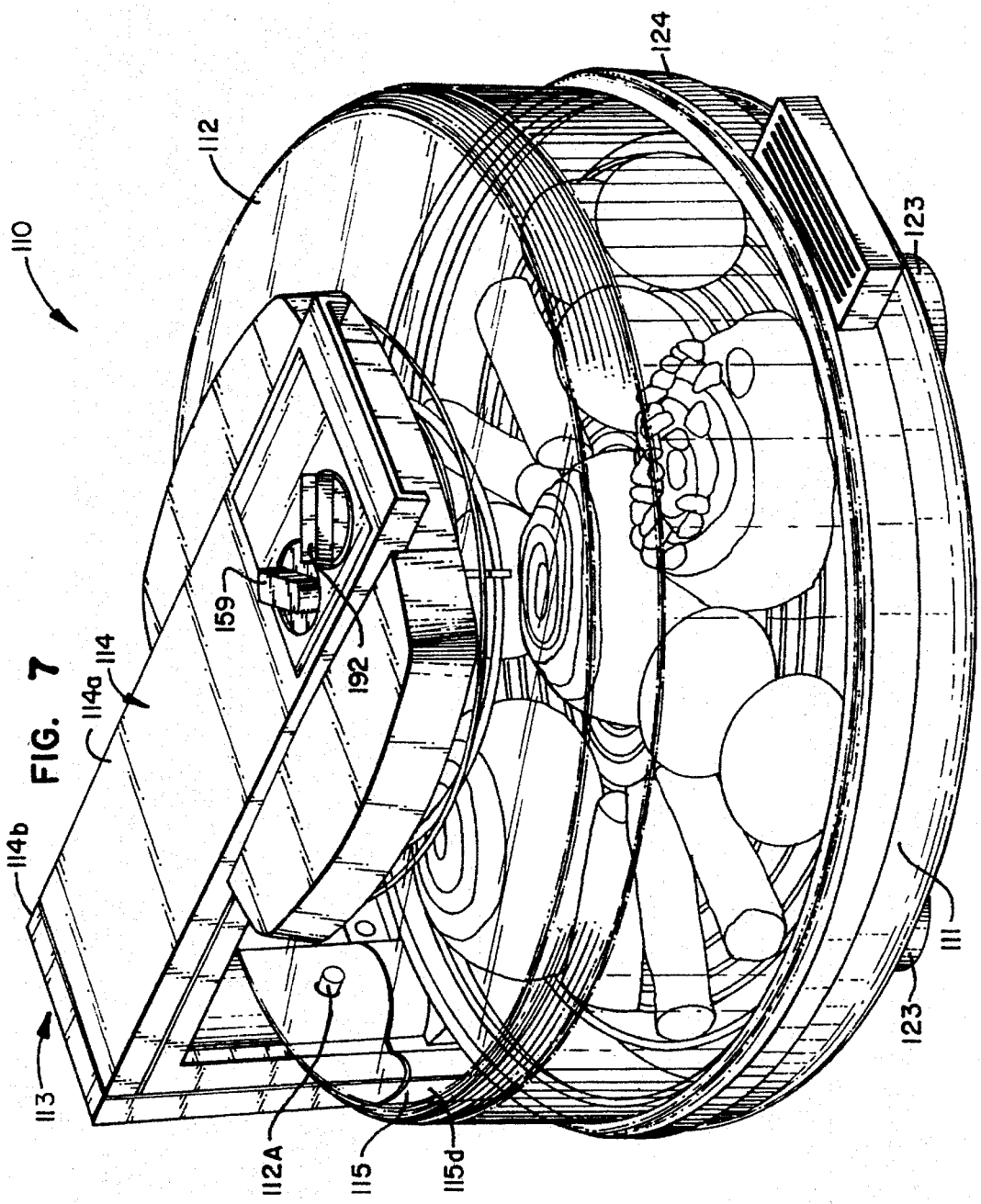
FIG. 7 is a perspective view of an alternate cooking device.
Figure 8:
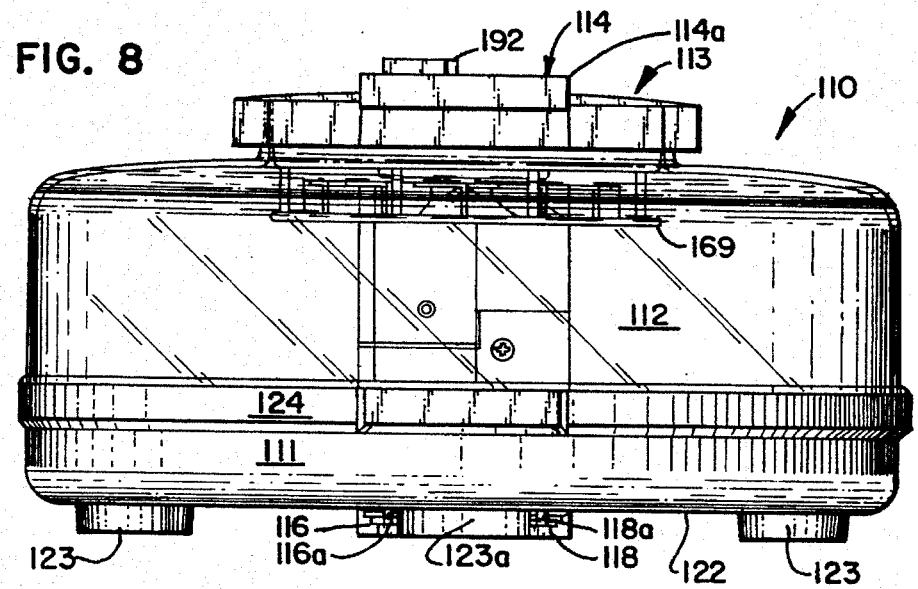
FIG. 8 is a front view of the cooking device of FIG. 7.
Figure 9:
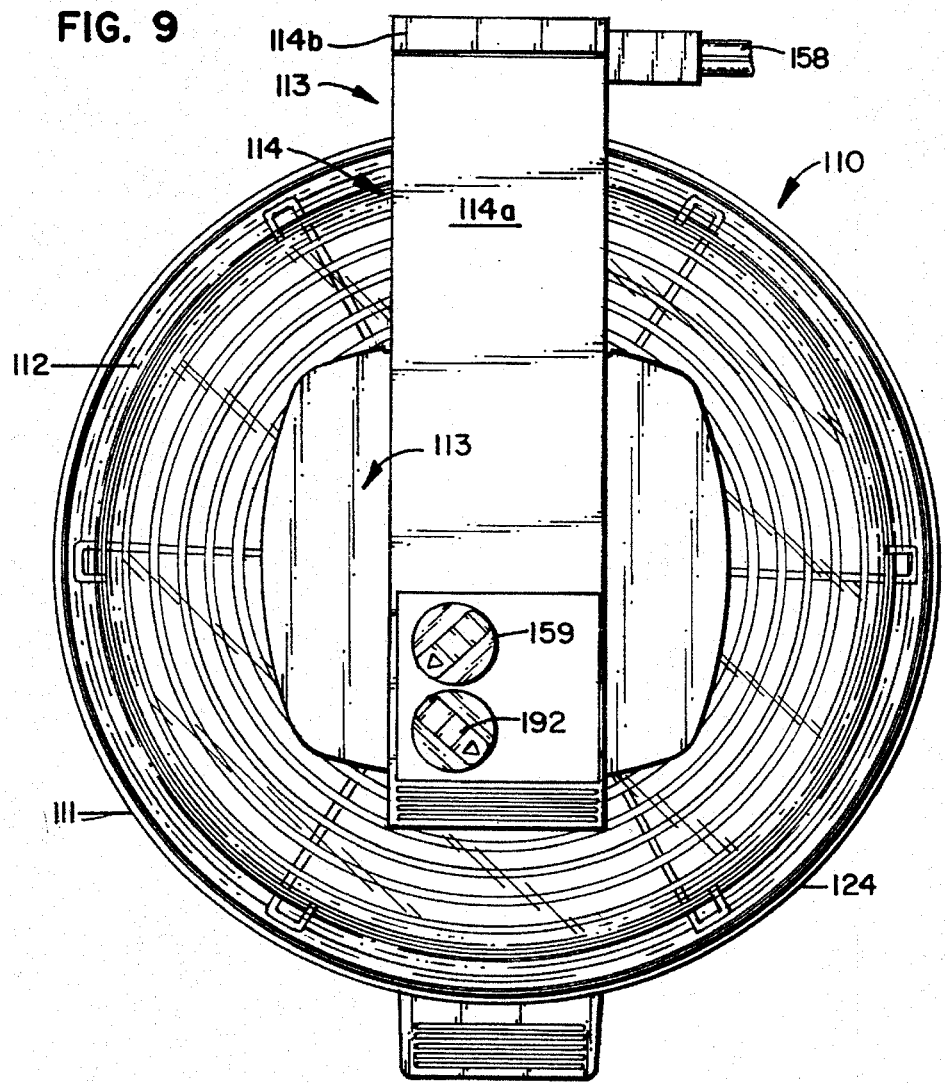
FIG. 9 is a top view.
Figure 10:
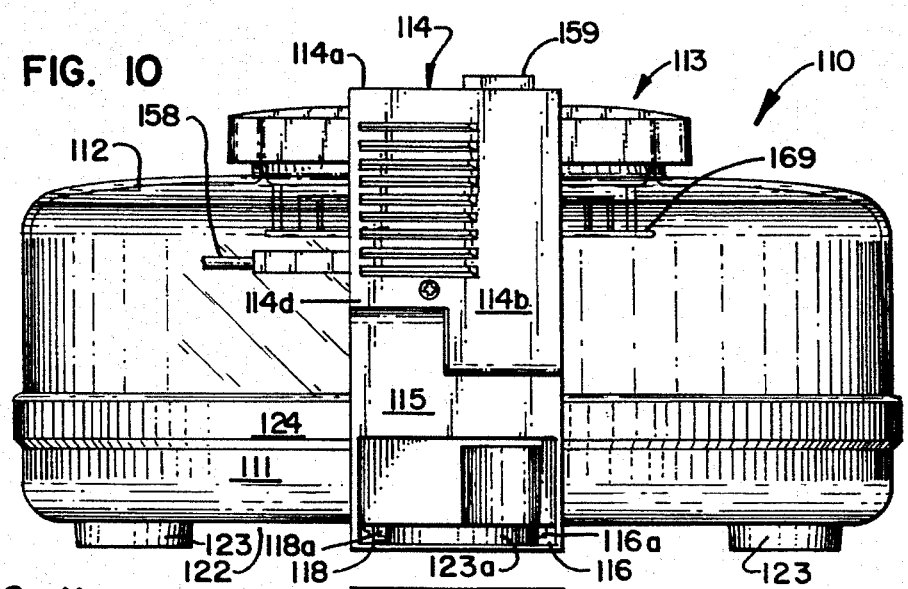
FIG. 10 is a rear view.

The structure of the power heater unit 13 is illustrated in FIGS. 2, 3 and 6. The power unit 13 includes a motor portion 41, a heater 42 and a blower blade 43. The motor portion 41 includes an inner housing 44 which may be of sheet metal, an outer housing 46 which may be injection molded plastic and a motor 47, including an armature 48 and a rotatably driven shaft 49 which extends outwardly from each side of the armature. The rotational direction of the shaft may be reversed by reversing the fields of the motor. The motor 47 is mounted to the inner housing 44 such as by a plurality of bosses 51 and screws 52. The screws 52 extend through suitable openings 53 in the upper wall 56 and an outwardly-extending flange 57. The housing 44 is closed on the bottom side by plate 58. The plate 58 corresponds in dimension to the outer edge of the flange 57 such that the housing 44 rests on the rim 33 of top 12. The housing 44 has an opening 59 for receipt of air for purposes of cooling the armature 48 as hereinafter described.

A plurality of snap mechanism 61 are attached by screws 62 at various locations around the periphery of the housing 44. The snap mechanism 61 may be of spring sheet metal and serves to secure the motor portion 41 to the top 12. Alternatively, a twist lock type of securement may be used to attach the power unit 13 to the top 12.

The housing 46 has a peripheral wall 69 and an integral upper wall 71. A handle 72 may be molded as part of wall 69. The lower portion 73 of wall 69 may be flared radially outwardly and includes a plurality of openings 64 through which air may exit. The upper frame bracket 15 may be integral with wall 69. The housing 46 may be secured to housing 44 such as by flange 50 and screw 50a.

The heater 42 is an open coil, resistance wire type, and is thermostatically regulated to maintain cooking temperatures ranging from 180° to 450° F. The heater 42 as shown in FIG. 6 may include an upper plate 76, a lower plate 77 and a resistance coil 78. The plates 76 and 77 are of a material that does not conduct electrical current. The coil 78 is sandwiched between plates 76 and 77 and thus electrically insulated from the remainder of the cooking device. The lower plate 77 has a plurality of open zones 75 defined therein through which the heated air may move. The plates 76 and 77 may be secured together by rivets 81. Heater 42 (FIGS. 3 and 6) may be secured to plate 58 by screws 82. The heater 42 is electrically connected to a source of power through wires 83, switch 68 and cord 67.

The open heater coil 78 is used in order to achieve the lowest possible surface watt density. With adequate air flow, such an element is capable of transferring maximum heat to the air stream via conduction, while operating in the "black" heat range. In order for other types of heating elements, such as tubular types, to give off the same wattage given the same space and air flow, the heater would glow. Such a high surface watt density would result in overheating of the motor blower, overheating of the food being cooked, and overheating of the plastic parts through an excessive radiation of heat. In addition, such an element would retain too much heat when the unit is shut off, causing additional overtemperature problems. It is to be noted that the air current flow from blower blade 43 changes direction by about 180°. Thus, any particulate material is thrown out of the air current before the air passes over the heater coil 4. Any smoke, however, is recirculated over the coil and thus burned up or consumed. This is of course beneficial.

The heater assembly may also incorporate an overtemperature device capable of shutting off power to the heater should the thermostat fail.

The power unit 13 includes an upper blade 63 which is mounted on shaft 49 of motor 47. The blade 63 draws fresh air through the upper portion of bracket 15 as illustrated by the arrows in FIG. 2 and 3. The blade 63 moves this cool fresh air upwardly around the motor 41 to cool the motor, up through openings 45 in housing 44 and downwardly and outwardly through the ports 64. The blower blade 43, which is mounted on the opposite end of shaft 49, moves the air currents within the heated chamber. The blade 43 (FIG. 6) has an open central portion which corresponds with the open central portion 75 of the heater 42.

The blade 43 (FIG. 3) creates two air circulations. The first air circulation is throughout the heated chamber. The second air circulation passes a small portion of air over the heated coils in the heater 42 as illustrated in FIG. 3. In other words, the small air current exits radially outwardly from the blade 43, reverses direction 180° to be drawn in over the coil 78, then radially inwardly to the center of the heater 42, then downwardly into the center zone of the blade 43. A protective grid 66 may be provided over the blade 43. This direction reversal assures that no particulate material remains in the air stream that contacts the coil 78.

Electrical current is fed into the device 10 by way of electric cord 67. The cord 67 may include a conventional plug for insertion into a wall socket. The electrical current passes through switch mechanism 68 mounted in the upper portion 15. The switch 68 includes a sensing mechanism to provide shutdown of the unit in the case of overheating in the heating chamber and/or motor housing 41. The switch mechanism 68 may also include sensing mechanism to shut down the unit if the top portion 12 is pivoted upwardly with the throw portion of the switch 68 in the "on" position.

OPERATION

Figure 5:
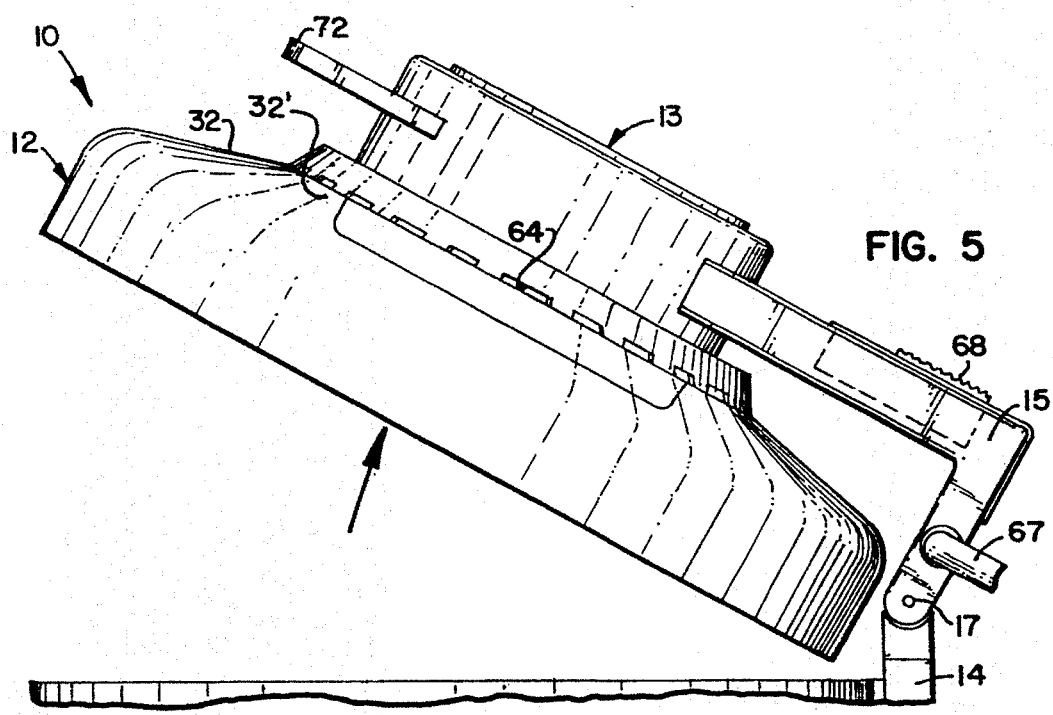
FIG. 5 is a fragmentary side view of the apparatus showing the top portion pivoted upwardly.

Although the operation of this equipment is readily apparent from the aforedescription, it will be further described in order to provide a more complete understanding of the method of the present invention. The cooking device may be accessed by pivoting the top portion 12 upwardly as illustrated in FIG. 5. Food pieces such as potatoes, bakery goods, pizzas and the like may be placed on the rack 29. The top portion 12 is then pivoted downwardly to the position illustrated in FIGS. 1 and 2. The switch 68 is then activated turning the heating element 42 and the motor 47 on. With the blade 43 rotating, air is moved within the chamber formed by the lower unit portion 11 and the upper portion 12. Air is circulated over the resistance coil thereby providing heat to the air stream and in turn to the chamber. The temperature will typically be at least 125° F. in the chamber. The temperature will preferably be in the range of 180°–450° F. The air velocity in the heated chamber will typically be over 1,000 linear feet per minute. The air velocity at the point where the air stream contacts the food pieces is between 1000 and 4000 linear feet per minute. If desired, a central wall 69A may be mounted in the heated chamber to provide a change in the air flow pattern. In this case, one has two cyclone configurations. Unlike most conventional cooking devices, the blower is placed in the top center of the cooking chamber. The blower wheel is mounted in such a way as to project the air stream into the uppermost portion of the cooking chamber. The upper surface of the air stream being at the same level or slightly lower than the upper wall of the chamber. In this position, the air thrown off the wheel travels horizontally in parallel, with the lower surface of the upper wall 32 of the chamber unit. The air stream is directed downward by the radius joining the upper wall and the vertical round side wall. The air then travels downwardly in a spiral until it is again deflected at the base of the outside wall by the radius joining the side wall with the lower wall of the enclosure. The air is then simultaneously pushed and drawn by the blower across both above and beneath the cooking rack. The rack 29 has handles 29a and may be inverted to raise or lower the cooking surface. As the air approaches the center of the enclosure, it is drawn up into the open underside of the blower blade 43, where it is then recirculated through the same pattern described above. A partial vacuum is drawn in the zone extending downwardly from the center of the blower blade.

The velocity of the air is not constant within the chamber, since the heated air converges as it moves to the center of the unit and is drawn into the blower. In the cooking device, the air cools as it contacts the food, but simultaneously accelerates as it converges on the center of the chamber. This change in velocity compensates for the dropping temperature by more effectively exchanging the heat remaining in the air. The result is very uniform cooking from the outer edge to the center of the cooking rack.

When cooking items that cover most of the cooking rack, such as a pizza, or that require a pan, such as cookies, air flow to the underside of the rack is prevented from being drawn back into the blower wheel. The trapped air swirls rapidly, but cools off significantly, due to inadequate air exchange with the heated air mass above the rack. To compensate for the above, one or more "mixing vanes" 69A may be located diagonally under the cooking rack. This causes the air to form two or more counter-rotating air masses that dramatically improve the air exchange under the rack. See FIGS. 1 and 2.

Because the present system is capable of developing very rapid air flows with a minimum motor size and power input, it is desirable to equip the cooking device with an adjustable motor speed control. Some items, such as cakes or pizzas with loose topping, should not be exposed to overly high air speeds (e.g. should be about 1000 linear feet per minute). When preparing such items, it is much preferred to reduce the air speed by lowering the motor speed. This results in a moderate extension of cooking time, but still provides much more rapid cooking than conventional ovens. Sensing mechanism may be provided to sense movement of the food materials and correspondingly reduce the air velocity to a point immediately below that at which movement takes place. The open coil heater 78 is positioned directly above the blower blade 43. The blower is fully open at the bottom, but also partially open on its top. As a result, the blower draws most of its make-up air into its bottom side, but also draws air into its top. This causes a portion of the air thrown out from the circumference of the blower to reverse direction and be drawn back through the heater perimeter, down through the open lower plate of the heater assembly and into the semi-open top of the blower wheel. This highly heated air is then mixed with the air being drawn in from the bottom of the blower. This mixture is then thrown out horizontally into the cooking chamber. This configuration provides the following advantages: Most particles are unable to make the abrupt 180° change in direction made by the air drawn through the heater. The air travelling through the heater assembly is virtually free of contamination, while most particles are thrown off to the sides and bottom of the cooking chamber, where they can easily be cleaned away. As a result of the above, the heater does not accumulate food, oil or grease, thereby eliminating the need to clean the heater. This also extends heater element life and prevents smoke or fire hazard.

Positioning the heater immediately above the blower saves substantial space, and allows for the compact design of an easily-removed blower assembly. When the assembly is removed, the entire cooking enclosure can then be washed in a conventional household dishwasher. The compactness allowed by the heater position leaves more visibility through the top wall of the transparent cooking enclosure, providing the user with a maximum view of the cooking operation. Due to the blower blades or wheel being located directly below the heater assembly, the blower wheel provides additional mechanical protection to the heater while further reducing the risk of electrical shock to the user.

Cleaning of any food preparation appliance is always a primary concern. The cooking device is designed to be easily disassembled, allowing the entire two piece cooking enclosure to be emersed in water for soaking or washing in a household dishwasher. The enclosure is molded of low-stick plastic capable of withstanding the maximum internal operating temperature of at least 400° F. The blower assembly contains all electrical components and easily mounts in the top half of the cooking enclosure, snapping in place by way of metal clips or by screwing into place, much like the lid on a jar. The blower assembly is dimensioned to fit easily inside the cooking enclosure for storage, thereby saving on scarce kitchen storage space and reducing shipping and packaging expense.

The upper assembly is hingedly mounted on a detachable support which connects to the underside of the cooking enclosure. The cooking enclosure is opened by lifting up on the handle section 72 of the unit and pivoting the entire assembly rearward until it stops in a vertical position. When the assembly is tilted rearward, an internal switch shuts off all power to the motor and heater, thereby eliminating any danger of injury due to contact with the moving blower.

Due to the extensive use of plastics and the need to keep assembly temperatures comfortable to the touch, internal cooling of the assembly may be necessary. The motor must also be kept within safe operating temperature limits.

To achieve the above objectives, the blower unit 63 has been designed to draw cool, room temperature air in from directly above the hinge area. Drawing air from that point avoids taking in hot air rising off of the cooking enclosure. This cool air is pulled through the rectangular segment connecting the motor enclosure to the hinge. This "duct" may also house electronic components that are heat sensitive or require cooling, such as triacs. From here, the air is drawn over the motor, up through a secondary blower wheel 63 directly above the motor and then exhausted downwardly around the outside walls of a "cup" 44 which surrounds the motor 48. This exhaust air is finally forced through a gap 74 separating the cooking enclosure and the bottom edge of the blower assembly. Here the air serves a valuable function of cooling the cooking enclosure plastic at its most vulnerable point, close to the heater assembly.

Any deformation of the blower mount area due to over-temperature trouble may render the cooking enclosure useless. Gussets may be molded into the blower mount area to act as stiffeners and cooling fins for the plastic.

When the blower is removed from the cooking enclosure, the user may then install optional attachments to convert the cooking device into a steamer, a corn popper or other application that would fit the configuration and features of the cooking enclosure.

ALTERNATE EMBODIMENT

A preferred cooking device 110 of the present invention is illustrated in FIGS. 7–18. Cooking device 110 includes a base enclosure member 111, an upper enclosure member 112 and an interconnecting member 113 for hingedly connecting member 111 with member 112. The device is thus a clamshell configuration with the upper enclosure being pivotable upwardly to provide access to the cooking chamber.

Figure 11:
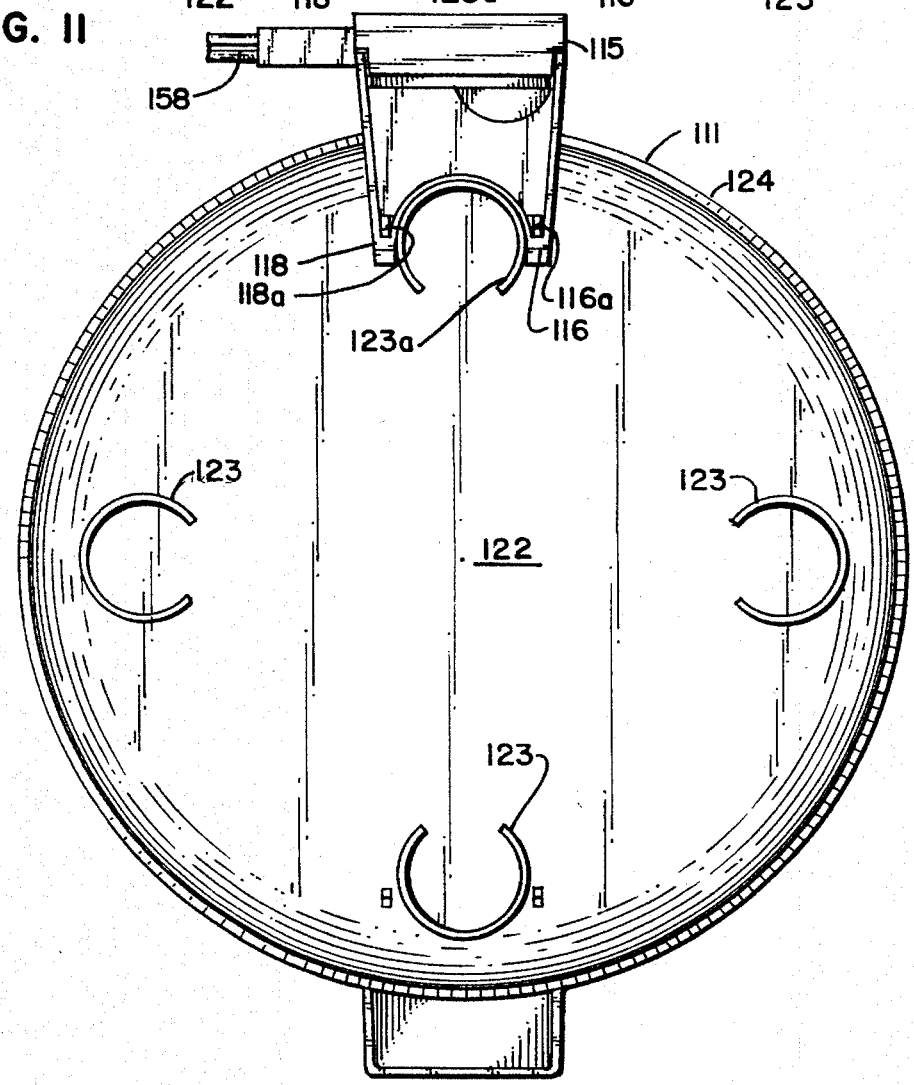
FIG. 11 is a bottom view.
Figure 12:
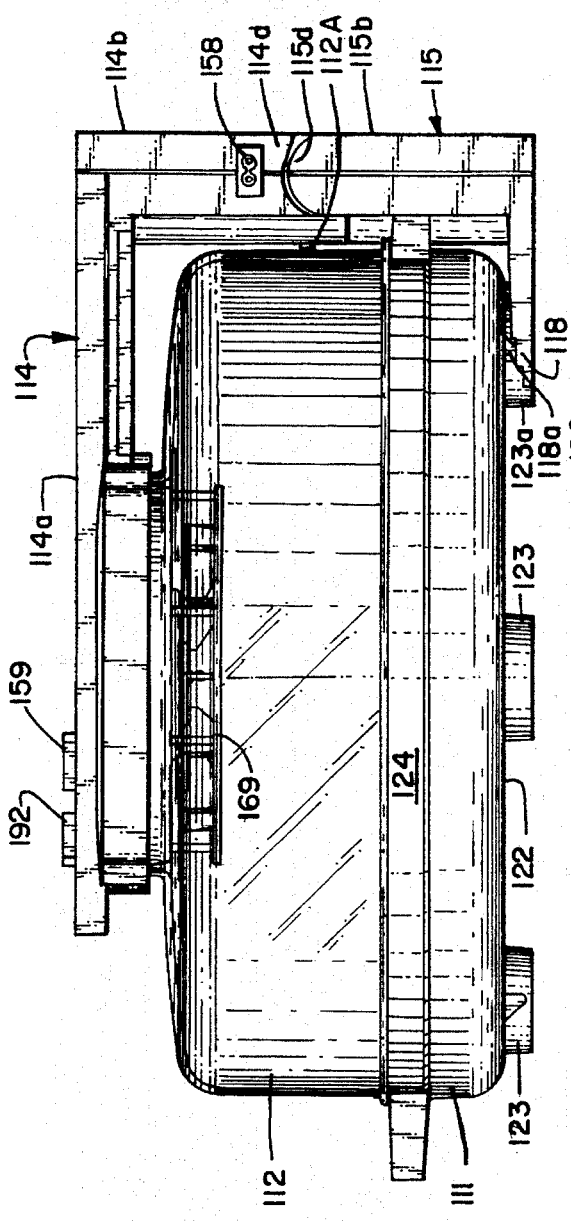
FIG. 12 is a right side view.
Figure 13:
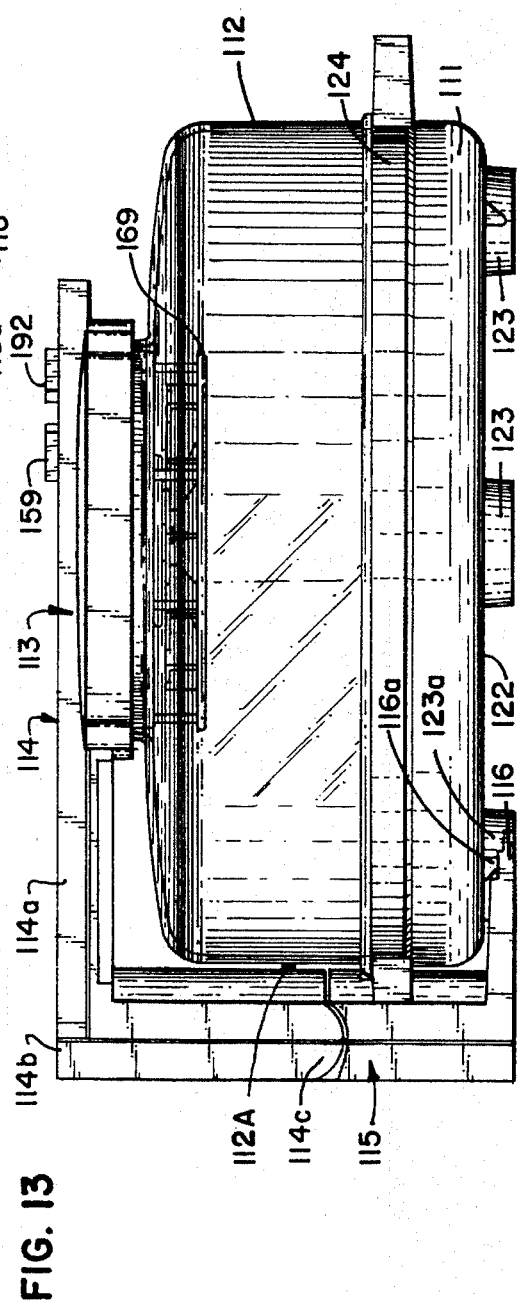
FIG. 13 is left side view.
Figure 14:
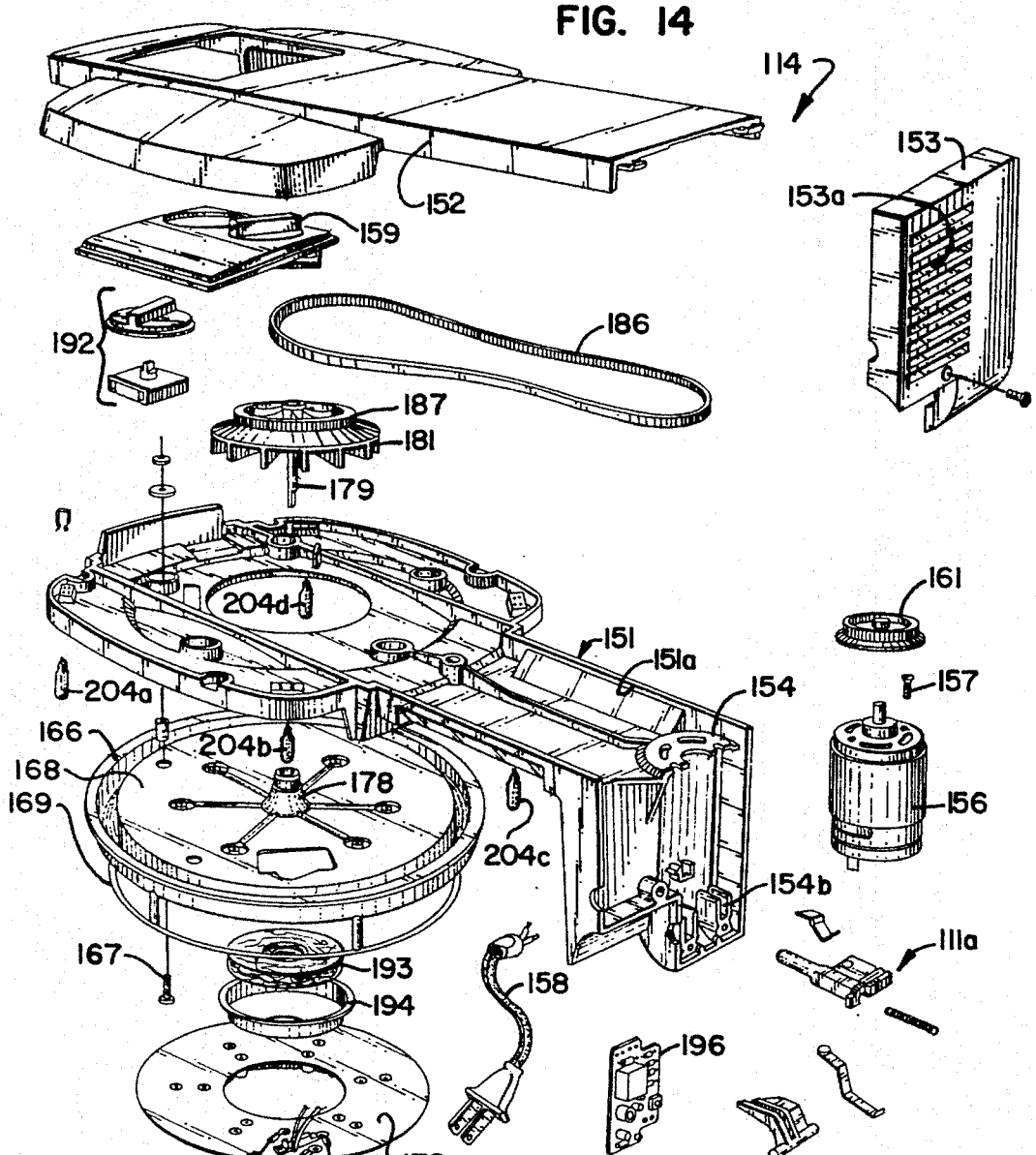
FIG. 14 is an exploded view of the power portion of the cooking device.
Figure 18:
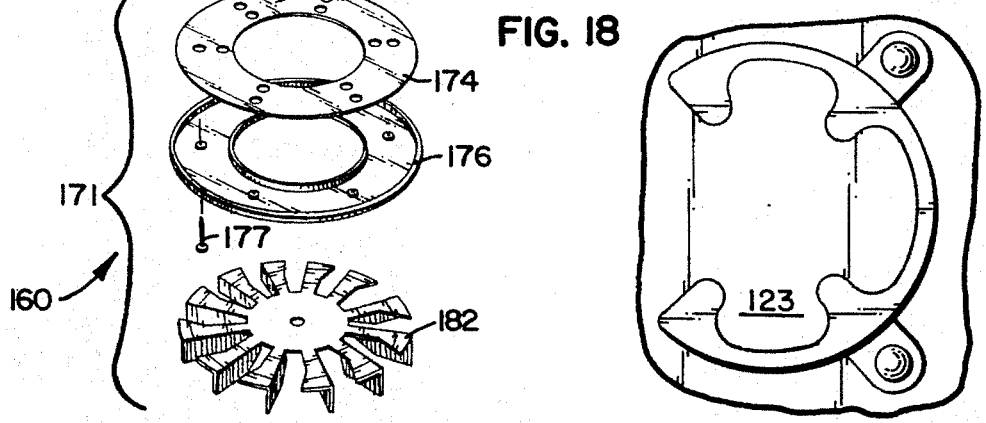
FIG. 18 is an enlarged bottom view of a leg portion of the device.
Figure 15:
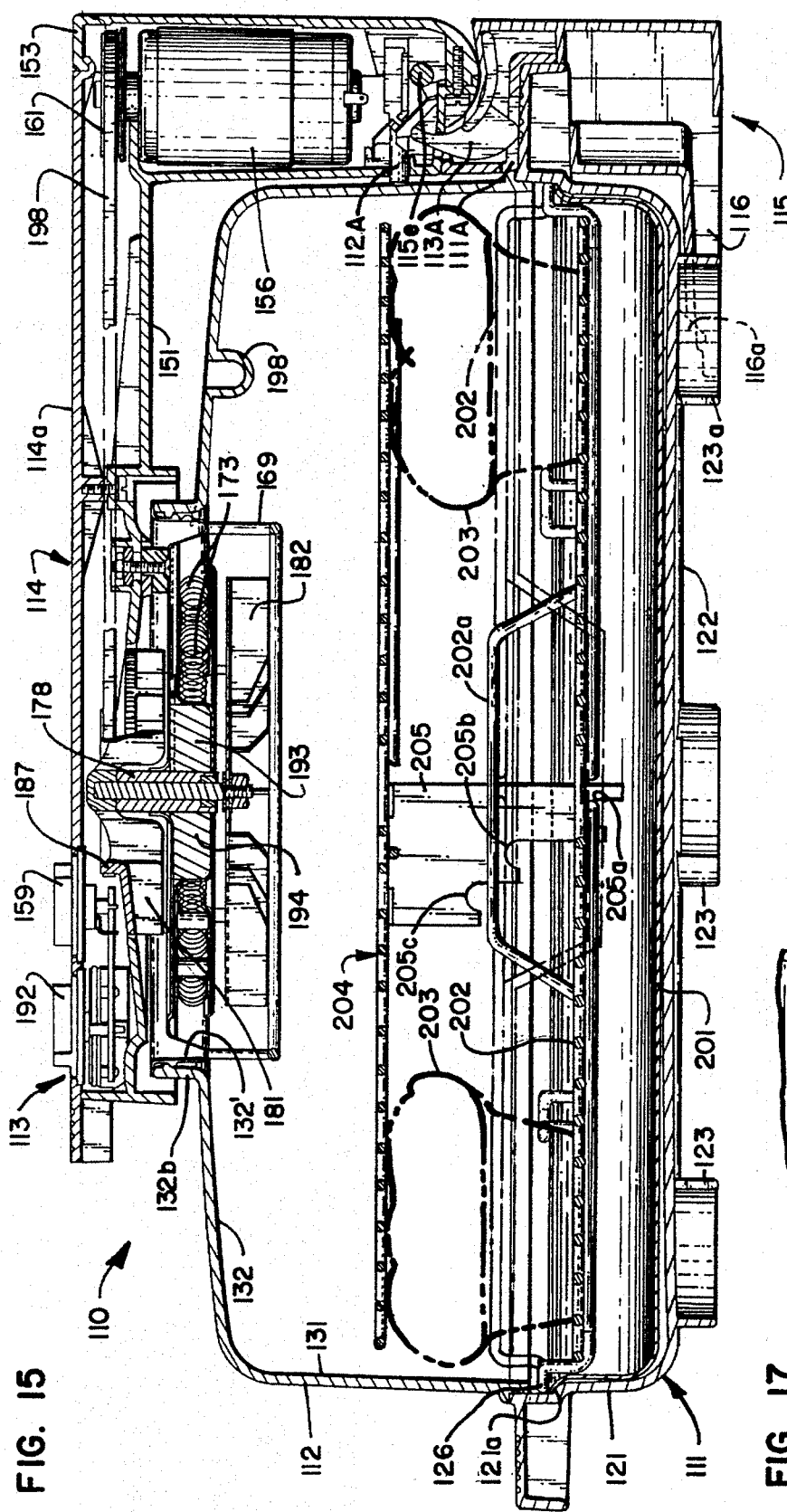
FIG. 15 is a cut view of the cooking device taken along the center line running from front to rear.
Figure 17:
FIG. 17 is an enlarged sectional view of the leg portion of the device.
Figure 16:
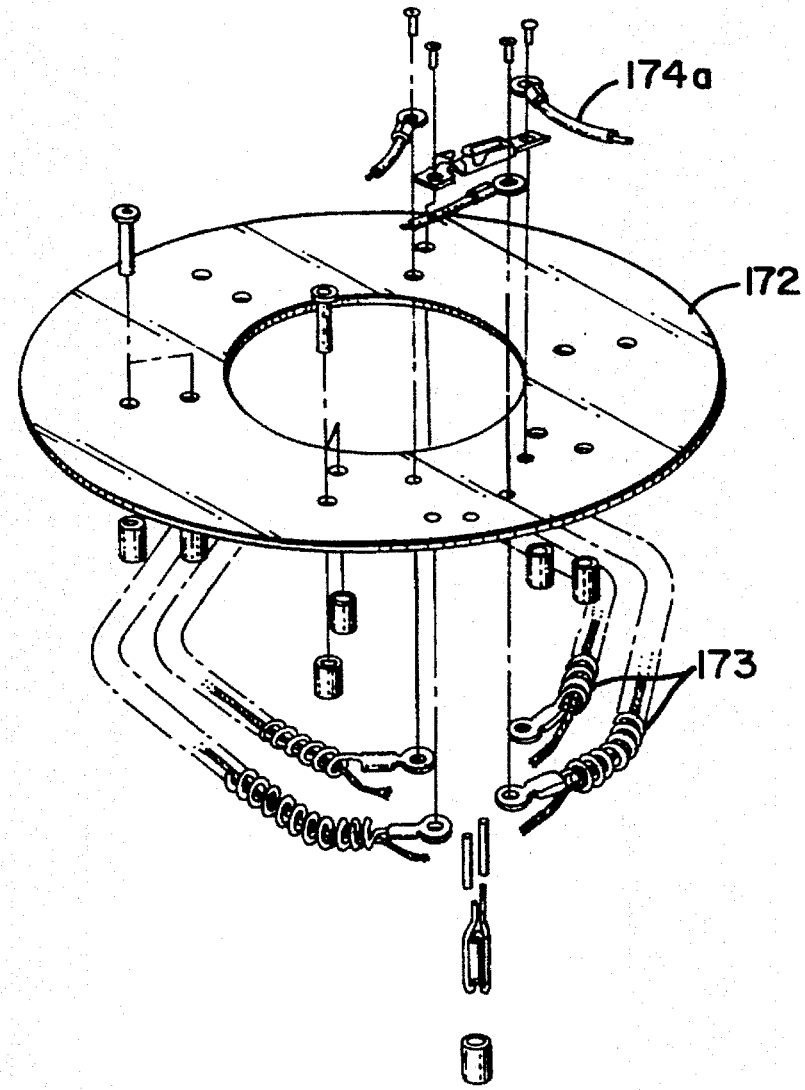
FIG. 16 is an enlarged exploded view of the heater coil of the cooking device.

The lower enclosure member 111 (FIGS. 7 and 15) includes a circumferential wall 121 which is integral with lower wall 122. Feet 123 support the lower wall 122 spaced upwardly from the surface on which the cooking device 110 is supported. The feet 123 may be of any desired shape. Preferably the shape of feet 123 is such as to avoid accumulation of heat. One such preferred shape is illustrated in FIGS. 11 and 18, namely, "C"-shaped. The lower member 111 including walls 122 and 124 and feet 123 may be suitably made of a polymeric material such as by injection molding. The polymeric material may be opaque and decoratively colored. The thicknesses of such walls and feet are sufficient to provide structural support for the device 110. The upper portion 121a of wall 121 may define a recess 126 for purposes of receiving the upper enclosure member 112 as hereinafter described.

The upper enclosure member 112 (FIGS. 7 and 15) includes a circumferential wall 131 and an integral upper wall 132. The wall 132 has an opening 132' that is defined by upstanding wall portion 132b. The upper member 112 may be constructed of any suitable polymeric material such as by injection molding. The polymeric materials used in members 111 and 112 are suitable to withstand the operating temperatures of the cooker 110, e.g. temperatures of at least 400° F. The polymeric material used in member 112 desirably is transparent thus enabling the user to observe the food pieces during cooking. A typical polymeric material is polyethersulphone.

The support member 113 (FIGS. 7, 12, 13 and 15) includes an upper support portion 114 and a lower support portion 115. The lower support member 115 has a horizontal leg 115a and a vertical leg 115b. The upper end of the vertical leg 115b has a concave portion 115c and a convex portion 115d.

The upper support member 114 is "L" shaped and has a horizontal leg 114a and a vertical leg 114b. The lower end of leg 114b has a convex portion 114c and a concave portion 114d. A pivot shaft 115e runs between convex portion 115d and convex portion 114c. The convex portion 115d lies cradled in concave portion 114d. The convex portion 114c lies cradled in concave portion 115c. The upper support portion 114 pivots on shaft 115e with respect to lower support portion 115.

The lower support portion 115 includes engagement mechanism 116 and 118 which frictionally secures support member 113 to leg 123a of member 111. The engagement mechanism 116 and 118 may simply snap into engagement with lugs 116a and 118a on the leg 123a.

The upper support portion 114 (FIGS. 14 and 15) includes a first housing portion 151, second housing portion 152 and rear housing portion 153. Housing portions 151–153 may be formed by injection molding. The housing portion 151 has a horizontal portion 151a and an integral vertical portion 151b.

The vertical portion 151a includes brackets 154a and 154b for securing the motor 156 in place. The motor 156 may be held in place such as by screws 157. An electrical cord 158 is electrically interconnected to motor 156 through switch mechanism 159 and the safety lock-out mechanism 111a, 112a and 113a. Suitable mechanism may be provided to convert AC current to DC current if the motor 156 is a DC motor. A pulley 161 is mounted to the shaft 156a of motor 156. The housing portion 152 of support 114 serves to cover the upper side of portion 151 and may be secured in place by screws (not shown). Housing portion 152 has a removable panel 152a which carries switch mechanism 159 and switch mechanism 192. The housing portion 153 serves to enclose support 114 to the rear and may include a grille structure 153a through which air may pass to cool motor 156.

The hinged connecting member 113 (FIGS. 7, 14 and 15) has a heater-blower unit 160 mounted therein. Unit 160 has a base plate 166 which is secured to housing member 151 such as by screws 167. The base plate 166 is constructed of an upper plate member 168 and a wire guard 169.

Heater assembly 171 (FIGS. 14–16) is mounted to the base plate 168. The heater assembly 171 includes plate 172 on which is mounted a resistance heating coil 173. The heating coil 173 may be of a nicklecadmeum material. Suitable connecting wires 174a are provided to connect the heating coil 173 with the switch mechanism 159. Heater assembly 171 has a mica heater ring 174 and a heater cover 176. The mica heater ring 174 serves to electrically insulate coil 173 from plate 172. The heater assembly 171, mica heater ring 174 and heater cover 176 may be suitably secured to the base plate 168 such as by screws 177.

The base plate 168 has a bearing 178 through which the shaft 179 of secondary blower assembly 181 may extend. The secondary blower 181 serves to cool the upper metal portions of the heater assembly such as base plate 168 and bearing 178. A primary blower blade 182 is secured to the lower end of shaft 179. A spun fiber glass blanket 193 is held in a cup shaped member 194 thereby shielding the bearing 178 from heat.

A flat drive belt 186 interconnects pulley 161 of motor 156 with the primary blower blade 182 by way of the pulley 187 on secondary blower assembly 181. The belt 186 is a flat belt such as is used as a timing belt.

Suitable controls 159 and 192 control respectively the electrical current fed to heating coil 173 and speed of motor 156.

The cooker 110 may include a control circuit board 196 permitting the setting of a single time-temperature-air velocity cycle or a complex series of time-temperature-air velocity segments in a cycle. The cycles may be pre-established at the factory or may be created by the homemaker. For example, the cycle may include a three step series for baking a loaf of bread. The first step is at 170° F. for 45 minutes for rising of the dough, the second step is at 325° F. for baking the loaf and the fourth step is at 450° F. for 5 minutes to crisp the crust of the loaf. The circuit board 196 may have a memory to store a plurality of such complex series for later selective use. The series may include an activation time, e.g., turn on time. The cooking device 110 may have lights 204a–204d to provide improved visibility of the food product during cooking. Such lights may direct light from all sides of the oven 110.

The present cooking device 110 desirably includes safety mechanism 111A that senses the presence of the lower or base member 111 and a mechanism 112A which senses the presence of upper member 112. The mechanism 113A senses the position of the upper member 112 to assure the device 110 is in a closed operating position before the blower 182 and coil 173 can be activated.

The present cooking device 110 desirably includes an air vent scoop 198 to remove a portion of the air stream thereby reducing the moisture content and in turn increasing the speed of cooking. The air scoop 198 must extend downwardly from the lower surface of wall 132 exposing an effective surface of between 0.1 and 0.3 square inches for each cubic foot of cooking chamber. The preferred scoop has an effective scooping surface of 0.17 square inch per cubic foot of cooking chamber.

Figure 19:
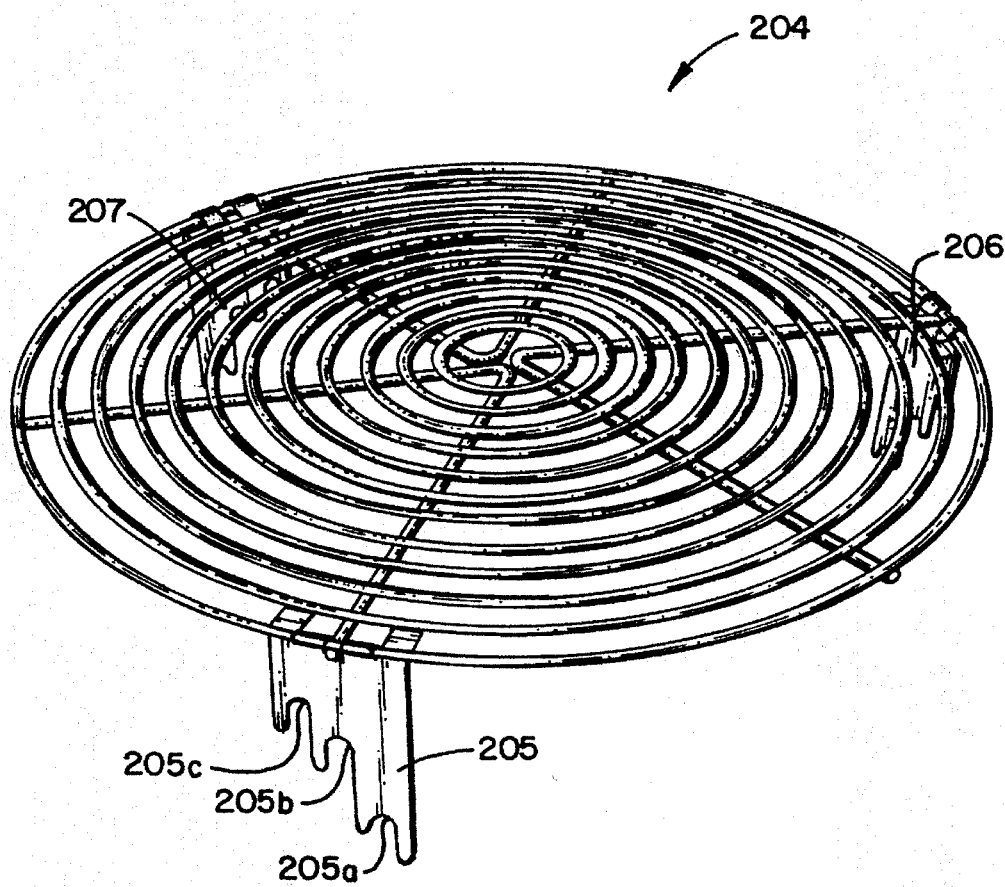
FIG. 19 shows the hold down rack.

The cooking device 110 may include a base liner 201 which may be constructed of sheet metal shaped like a shallow pan. The base liner 201 is spaced from wall 122 and catches any dropping juices of fats from the food during cooking and thereby facilitates cooking. The base liner 201 also serves as a partial heat barrier and reduces the heat escaping downwardly through wall 122. The base liner 201 may have a non-stick coating such as Silverstone™. A wire support or rack 202 may be mounted in the lower member 111. The wire support 202 serves to support food pieces 203 during cooking. The wire support 202 has handles 202a. The wire support 202 may be inverted to raise or lower the cooking surface. In some instances a hold down rack 204 (FIGS. 15 and 19) may be provided to permit use of higher air velocities particularly with light weight food pieces and yet avoid displacement of the food pieces. The hold down rack 204 may be of a wire construction similar to support 202. The hold down rack 204 may be supported on wire support 202 by legs 205, 206 and 207. Each leg such as 205 may have three or more support notches such as 205a, 205b and 205c.

OPERATION

While the operation of device 110 is apparent from the aforedescription it will be further described hereinafter in order to provide a more complete understanding of the invention. To operate the cooking device 110, one connects the device 110 to household electrical current by way of cord 158. The blower is then activated using control 159. Next the temperature control 192 is adjusted to the appropriate operating temperatures. If one wishes to add some food pieces to the cooking device 110 one merely grasps the handle portion 114a pivoting the upper member 112 upwardly on the shaft 13a. In so doing the switching mechanism deactivates the heater coil 173 and the motor 156. When the upper member 112 is again pivoted downwardly the switching mechanism reactivates the motor 156 and the heater coil 173.

The blower is activated by providing electrical current to drive motor 156 which then drives belt 186 carried on pulleys 161 and 187. The pulley 187 drives secondary blade 181 and primary blower blade 182. Blade 181 draws in fresh air which cools motor 156 and other portions of the present cooking device such as base plate 168. The blower blade 182 creates a primary air flow in a downwardly directed cyclone pattern to cook food pieces and a secondary flow which passes over the electrical coil 173. The heated air is commingled then with the primary air flow.

While various specific details are described with respect to this embodiment of the invention it is to be recognized that various modifications may be made without departing from the broader scope of the present invention.

What is claimed is:

1. A device for rapidly cooking food comprising means for defining a self-contained cooking chamber, a powered fan blade disposed in said cooking chamber, means for rotating said blade which is positioned to create an air stream having a velocity in excess of 1000 linear feet per minute adjacent food in said cooking chamber and means for heating said air stream to a temperature of from 180° F. to 450° F., said means for heating being disposed entirely above said fan blade.

2. The device of claim 1 wherein said fan blade and said cooking chamber are adapted to create an air stream having a cyclonic pattern.

3. The device of claim 2 wherein said fan blade and said cooking chamber are adapted to create an air stream having a double helix shape, one of said helices having a straight axis that is vertically oriented and a second helix having a circular axis that is horizontally oriented.

4. The device of claim 1 wherein said means for defining a cooking chamber comprises a lower member and an upper member, said lower member comprising an upwardly opening bowl-shaped member and said upper member comprising a downwardly opening bowl-shaped member.

5. The device of claim 4 wherein said upper member comprises a curved transition wall, a circumferential wall and a top wall, said curved transition wall joining said circumferential wall and said top wall, wherein said fan blade throws an air stream in a radially oriented arc outwardly to strike said curved transition wall which causes said air stream to then move downwardly in a spiral to said lower member thence inwardly to a zone adjacent an axial center of said lower member and then upwardly to said fan blade where said air stream is again powered by said blade to achieve said velocity.

6. A device for rapidly cooking food comprising means for defining a self-contained cooking chamber, means for heating a first air stream to a temperature of at least 180° F., and a powered fan blade which is positioned and rotated to create a second air stream which is in thermal communication with said first air stream, and which has a velocity in excess of 1000 linear feet per minute adjacent food pieces in said cooking chamber, said means for defining comprising a lower member and an upper member, said lower member comprising an upwardly opening bowl-shaped member and said upper member comprising a downwardly opening bowl-shaped member, said upper member having a circumferential wall and an interconnected upper wall, said circumferential wall and said upper wall being interconnected by a curved transition wall, wherein said fan blade throws said second air stream in an essentially unrestricted radially oriented arc outwardly to strike said curved transition wall which causes said second air stream to then move downwardly in a spiral to said lower member thence inwardly to a zone adjacent an axial center of said lower member and then upwardly to said fan blade where said second air stream is again powered by said blade increasing said second air stream velocity to achieve a velocity of at least 1000 linear feet per minute adjacent food in said cooking chamber.

7. A counter top oven for cooking food comprising, a lower upwardly facing bowl-shaped member, an upper downwardly facing member having an inner surface, and a hinged interconnecting member, said interconnecting member interconnecting said upper member and said lower member, while said interconnecting member allows said upper member to rotate from a first position, where said upper member is disposed on said lower member, to a second position, where said upper member is separated from said lower member, said oven including means for moving air at an elevated velocity in an air stream and means for heating said air stream to a temperature of at least 180° F., said means for moving air being disposed in said upper member, said means for moving air further comprising a rotatable impeller blade projecting downwardly into said cooking chamber and positioned such that when said impeller blade is rotated said air stream is thrown from said impeller blade in an essentially unrestricted radially oriented arc adjacent the inner surface of said upper member.

8. The counter top oven of claim 7 wherein said upper member comprises a circumferential wall, an arcuate wall, and an upper wall, said arcuate wall joining said circumferential wall and said upper wall.

9. The counter top oven of claim 7 wherein said upper member defines an opening and wherein said means for moving and said means for heating are mounted relative to said upper member such that said means for moving extends through said opening in said upper member.

10. The counter top oven of claim 7 wherein said upper member has an opening defined in an axial center thereof, and wherein said means for moving and said means for heating are removably mounted relative to said upper member.

11. The counter top oven of claim 7 wherein said means for moving is adapted to create a cyclonic air stream pattern in said oven.

12. The counter top oven of claim 7 wherein said means for moving is adapted to create air stream velocities of at least 1000 linear feet per minute adjacent food in said oven.

13. The counter top oven of claim 7 wherein said oven is designed for storing said interconnecting member between said lower member and said upper member.

14. The counter top oven of claim 7 wherein said oven is designed to be disassembled for placing said lower member and said upper member in a dishwasher.

15. The counter top oven of claim 7 wherein said lower member and said upper member are cooperatively a serving container.

16. The counter top oven of claim 7 wherein said upper member and said lower member are formed from plastic to avoid burning a user should a user touch at least one of said members and wherein said oven is capable of heating to a temperature of 450° F.

17. The counter top oven of claim 7 wherein said oven includes a hold down rack which permits high air velocities without displacement of food pieces.

18. The counter top oven of claim 7 wherein said interconnecting member further comprises an upper bracket and a lower bracket, said upper and lower brackets cooperatively comprising a back surface, said oven being storable, while resting on said back surface.

19. The counter top oven of claim 11 wherein said air stream converges adjacent a center of said cooking chamber, thereby increasing said air stream velocity at said center of said cooking chamber and thereby compensating for dropping air temperature as said air stream converges adjacent said center of said cooking chamber.

20. The counter top oven of claim 7 wherein said upper member has a plurality of lights to illuminate food from a plurality of locations.

21. A device for rapidly cooking food comprising means for defining a cooking chamber, a powered impeller blade for creating an air stream, and means for heating said air stream, said blade being disposed in said chamber such that said air stream has a velocity of at least 1000 linear feet per minute and a temperature of at least about 180° F. adjacent food in said cooking chamber, said means for defining comprising a lower member and an upper member, said lower member comprising an upwardly opening bowl-shaped member and said upper member comprising a downwardly opening bowl-shaped member, said upper member having a circumferential wall, a curved transition wall and an upper wall, said curved transition wall joining said circumferential wall and said upper wall, wherein said fan throws an air stream in an essentially unrestricted radially oriented arc outwardly adjacent said upper wall, said curved transition wall causing said air stream to then move downwardly in a spiral to said lower member thence inwardly to a zone adjacent an axial center of said lower member and then upwardly to said impeller blade where said air stream is again powered by said blade increasing said air stream velocity to achieve said velocity of at least 1000 linear feet per minute adjacent food in said cooking chamber, said device including means for releasably contacting said upper member and said lower member comprising a hinged clamp-like member for moving said upper member into contact with said lower member and permitting said upper member to be hingedly pivoted upwardly to provide access to said cooking chamber when said device is in an inoperative mode.

22. A counter top oven comprising a lower upwardly facing bowl-shaped enclosure member, an upper downwardly facing enclosure member and a hinged interconnecting member, said members defining a cooking chamber and said members cooperating to form a clamshell structure, said oven including means for moving air at an elevated velocity and means for heating said air, said means for heating including a resistance heater coil and said means for moving including a blower blade, said blade producing a first air stream inside the cooking chamber and producing a second air stream outside the cooking chamber which reverses direction 180° immediately prior to passing over said heater coil.

23. A counter top oven comprising a lower upwardly facing bowl-shaped enclosure member, an upper downwardly facing enclosure member and a hinged interconnecting member hingedly joining said lower member and said upper member such that said members cooperate to form a clamshell structure, a heater-blower unit disposed in said upper member, and a cool zone adjacent a periphery of said upper enclosure member, said heater-blower unit further comprising a motor disposed within said cool zone, an impeller blade disposed inside said upper enclosure upper member, and a drive belt providing communication between said motor and said impeller.

24. The counter top oven of claim 23 wherein said drive belt is a flat belt.

25. The counter top oven of claim 24 wherein said interconnecting member has intake ports, exhaust ports and internal passageways therethrough, wherein said impeller draws fresh air in said intake ports, partially through said internal passageways, over said motor for cooling said motor, further through said internal passageways out said exhaust ports and initially over an upper surface of said upper enclosure member to cool said upper enclosure member thereby avoiding deformation of said upper enclosure member.

26. A counter top oven comprising a lower upwardly facing bowl-shaped enclosure member, an upper downwardly facing enclosure member and a hinged interconnecting member, said members cooperating to form a clamshell structure, said oven including means for moving air at an elevated velocity between said enclosure members and means for heating said air, said oven further including a cooking rack supported in said lower member in an elevated position, an air mixing vane which acts on said air to create counter rotating air masses to improve air exchange between air flowing above said cooking rack and air flowing below said cooking rack.

27. A device for rapidly cooking food pieces comprising means for defining a self contained cooking chamber, a powered fan blade to create an air stream inside said cooking chamber, and means for heating said air stream, said air stream having a velocity of at least 1000 linear feet per minute and a temperature of at least about 180° F. where said air stream flows adjacent food pieces in said cooking chamber, said cooking chamber being defined by a lower member and an upper member, said lower member comprising an upwardly opening bowl-shaped member and said upper member comprising a downwardly opening bowl-shaped member, said upper member having a circumferential wall and an interconnected upper wall, said circumferential wall and said upper wall being interconnected by a curved transition wall, wherein said fan blade throws said air stream in a radially oriented arc outwardly to strike said curved transition wall which causes said air stream to then move downwardly in a spiral to said lower member thence inwardly to a zone adjacent an axial center of said lower member and then upwardly to said fan blade where said air stream is again powered by said blade increasing said air stream velocity to achieve a velocity of at least 1000 linear feet per minute in said cooking chamber;

said air stream comprising a combination air stream including a first air stream flow path and a second air stream flow path, and wherein said fan blade includes means for drawing a portion of air out of said first air stream flow path to create said second air stream flow path, said means for drawing passing said second portion of air over said means for heating and returning said portion of air from said second air stream to said first air stream thereby recirculating said portion of air past said means for heating to heat said first air stream; and said device further including means for releasably contacting said upper member and said lower member, said means for releasably contacting comprising a hinged member for allowing said upper member to contact said lower member and permitting said upper member to be hingedly pivoted upwardly to provide access to said cooking chamber when said device is in an inoperative mode.

28. The device of claim 27 wherein said air stream has a maximum velocity of at least 4000 linear feet per minute adjacent food in said cooking chamber.

29. The device of claim 27 wherein said device includes safety switching means for making said device inoperative when said upper member is hingedly moved upwardly.

30. An oven comprising:

a cooking chamber, said cooking chamber further comprising an upper member, said upper member further comprising an upper circumferential wall an upper arcuate wall and a top wall having a top opening through the center thereof, said upper arcuate wall joining said upper circumferential wall and said top wall such that said upper member is of an inverted dish shape, said cooking chamber further comprising a lower member, said lower member further comprising a lower circumferential wall, a lower arcuate wall, and a bottom wall, said lower arcuate wall joining said circumferential wall and said bottom wall such that said lower member is of a dish shape, and said cooking chamber comprising an interconnecting member, said interconnecting member further comprising an upper interconnecting portion and a lower interconnecting portion, said upper interconnecting member being attached relative to said upper member, said upper interconnecting member being joined relative to said lower interconnecting member, and said lower member being joined relative to said lower member;

means for creating an air stream, said means being at least partially disposed below said opening in said top wall;

a motor communicating with said means for creating, said motor being disposed inside said upper interconnecting member; and air intake means for drawing air into said upper interconnecting member, around said motor and out exhaust ports in said interconnecting member.

31. An oven comprising:

means for heating air to a temperature of at least 180° F.;

means for creating an air stream in thermal communication with said means for heating;

an upper member comprising a generally frustoconical wall, a first transition wall, and a first generally circumferential wall, wherein said frustoconical wall is joined to said first transition wall which is joined to said first circumferential wall, wherein said frustoconical wall guides said air stream in a uniform and radially outward pattern adjacent said frustoconical wall until said air stream converges on said first transition wall, wherein said first transition wall guides said air stream out of said radial outward pattern and into a first uniform cyclonic pattern, and wherein said first circumferential wall guides said air stream in said first uniform cyclonic pattern adjacent said first circumferential wall while said air stream spirals away from said frustoconical wall; and a lower member comprising a second generally circumferential wall, a second transition wall, and a generally planar wall, wherein said second circumferential wall is joined to said second transition wall which is joined to said planar wall, wherein said second circumferential wall is disposed adjacent said first circumferential wall such that said air stream continues flowing in said first uniform cyclonic pattern spiraling away from said frustoconical wall until said air stream converges on said second transition wall, wherein said second transition wall guides said air stream out of said first cyclonic pattern and into a uniform and radially inward pattern, and wherein said planar wall guides said air stream in said radially inward pattern until said air stream converges on itself and is forced into a second cyclonic pattern extending towards said frustoconical wall where said stream is then again guided radially outward.

32. The oven of claim 31 wherein said first cyclonic pattern has turns which are generally equa-radial to an axis passing through said first and said second planar members at axial centers thereof.

33. The oven of claim 31 wherein said means for creating is positioned adjacent said frustoconical wall.

34. The oven of claim 31 further comprising:

a protective grid, wherein said protective grid is streamlined so as to not impede the uniformity of the air stream, and wherein said grid impedes access to said means for creating an air stream.

35. The device of claim 1 wherein said cooking chamber comprises a top wall, a bottom wall, and a circumferential wall, wherein said fan blade throws an air stream in a radially oriented arc outwardly along said top wall, then downwardly along said circumferential wall, and then radially inward along said lower wall, and finally upwardly along an axial center of the cooking chamber, and wherein said upward movement of the air stream along the axial center creates a vacuum along the axial center of the cooking chamber.

36. The device of claim 1 wherein said fan blade draws air upwardly in a center region of said cooking chamber, so as to create a vacuum in said center region.

37. A rapid cooking device, comprising an upper member and a lower member which together define a cooking chamber, said upper member having an opening therein, a rack disposed within said cooking chamber for supporting food to be cooked, a blower mounted in the opening in said upper member, said blower comprising a blower wheel located within said cooking chamber, heating means mounted in the opening of said upper member for heating the air within said cooking chamber to a temperature of at least 180° F., and a hinged interconnecting member, said interconnecting member holding said upper member and said lower member together during operation and permitting said upper member to be hingedly pivoted upwardly to provide access to the interior of said cooking chamber when the blower is not in operation.

38. The rapid cooking device of claim 37 further comprising a safety switching mechanism which renders the blower inoperative when said upper member is pivoted upward.

39. The rapid cooking device of claim 37 wherein said upper member comprises a circumferential wall, a generally-planar top wall, and an arcuate wall connecting together the circumferential wall and the top wall.

40. The rapid cooking device of claim 37 wherein said interconnecting member comprises a substantially L-shaped lower frame bracket attached to the lower member, a substantially L-shaped upper frame bracket attached to the upper member, said upper and lower frame brackets being pivotable with respect to each other.

41. The rapid cooking device of claim 40 wherein said interconnecting member further comprises a pin for pivotally connecting together said upper and lower frame brackets.

42. The rapid cooking device of claim 37, wherein said upper and lower members are made of plastic.

43. The rapid cooking device of claim 37, wherein said blower comprising a second fan blade which draws fresh air over the motor so as to cool the motor and expels said fresh air over an upper surface of the upper member so as to cool the upper member.

44. The rapid cooking device of claim 37, wherein said lower member comprises an upwardly opening bowl-shaped member and said upper member comprises a downwardly opening bowl-shaped member.

45. The rapid cooking device of claim 37 wherein said interconnecting member may be separated from said upper and lower members for cleaning or storage.

46. The device of claim 4, wherein the means for defining a cooking chamber further comprises an air vent scoop for removing a portion of the air stream from within the cooking chamber.

47. The device of claim 46, wherein the upper member comprises a top wall and a circumferential side wall, and wherein the air vent scoop extends downwardly from the top wall of the upper member.

48. The device of claim 46, wherein the cooking chamber has a volume, and wherein the air vent scoop exposes an effective surface of area of between 0.1 and 0.3 square inches for each cubic foot of volume of the cooking chamber.

49. The device of claim 46, wherein the air vent scoop exposes an effective surface of area of approximately 0.17 square inches for each cubic foot of volume of the cooking chamber.

50. The device of claim 2, wherein the air stream has a direction and wherein a direction of rotation of said powered fan blade may be reversed to reverse the direction of the air stream.

51. A counter top oven comprising:

an upper member and a lower member which together define a cooking chamber, said cooking chamber having a circular horizontal cross-section and an ovular vertical cross-section, said upper member having a central opening located therein;

a rack disposed within said cooking chamber for supporting food to be cooked;

a blower, said blower comprising a blower wheel located within said cooking chamber, said blower being adapted to move a heated air current in the cooking chamber at rapid velocity; and heating means for heating the air within said cooking chamber, said heating means being completely disposed above said blower wheel and comprising a plate with an opening therein and a heater mounted above said plate which heats the air current to a temperature in the range of 150 to 450 degrees F.

52. The oven of claim 51, said blower further comprising a motor disposed outside of said cooking chamber, said motor being connected to said blower wheel.

53. The oven of claim 51, wherein said heater comprises an open wire resistance heater.

54. The oven of claim 52, further comprising means located outside said cooking chamber for creating a secondary air flow to cool said motor and an upper wall of said upper member.

55. The oven of claim 54, wherein said means for creating a secondary air flow comprises an air duct for carrying air from a zone at the periphery of the cooking chamber to a zone adjacent the upper end of said motor, a jacket surrounding said motor for carrying air from said duct along said motor thereby cooling said motor, and means for directing the air from said jacket outwardly along the upper wall of said upper member.

56. The oven of claim 51, wherein said blower wheel is positioned and rotated so as to create an air stream in excess of 1000 feet per minute adjacent food in said cooking chamber.

57. The oven of claim 51, wherein said blower wheel is positioned and rotated so as to create an air stream in excess of 2600 feet per minute adjacent food in said cooking chamber.

58. The oven of claim 52, further comprising a housing which contains said motor, said housing being attached to said upper member by quick release screw mechanisms.

59. The oven of claim 58, further comprising a switch mechanism which places said blower in an operable mode when said housing is attached to the upper member and places said blower in an inoperable mode when said housing is not attached to said upper member.

60. The oven as claimed in claim 51, wherein said blower wheel creates first and second air currents, said first air current flowing from said blower wheel to said resistance coil and then downwardly through the opening in said plate, said second air current flowing from said blower wheel into said cooking chamber, wherein said blower wheel mixes said first and second air currents.

61. The oven of claim 51 wherein said upper member has a circumferential wall, a top wall, and a first curved transition wall which connects said circumferential wall and said top wall, wherein said lower member has a circumferential wall, a bottom wall, and a second curved transition wall which connects said circumferential wall and said bottom wall, and wherein said blower wheel throws an air stream in a radially oriented arc outwardly to strike said first curved transition wall which causes said air stream to spiral downwardly to strike said second curved transition wall, causing the air stream to flow to a zone adjacent the axial center of the cooking chamber and then upwardly to said blower wheel.

62. The oven of claim 51, wherein said plate is circular in shape and the opening is in the center thereof.

63. The oven of claim 51, wherein the heater is an open wire resistance heater mounted on said plate.

* * * * *